(12) United States Patent
Truemper

(10) Patent No.: US 8,458,104 B2
(45) Date of Patent: Jun. 4, 2013

(54) SYSTEM AND METHOD FOR SOLVING MULTIOBJECTIVE OPTIMIZATION PROBLEMS

(75) Inventor: Klaus Truemper, Plano, TX (US)

(73) Assignee: Board of Regents, The University of Texas System, Austin, TX (US)

(*) Notice: Subject to any disclaimer, the term of this patent is extended or adjusted under 35 U.S.C. 154(b) by 443 days.

(21) Appl. No.: 12/817,902

(22) Filed: Jun. 17, 2010

(65) Prior Publication Data

US 2010/0325072 A1 Dec. 23, 2010

Related U.S. Application Data

(60) Provisional application No. 61/187,798, filed on Jun. 17, 2009.

(51) Int. Cl.
*G06F 15/18* (2006.01)
*G06F 17/10* (2006.01)

(52) U.S. Cl.
USPC .................................. 706/12; 703/2

(58) Field of Classification Search
None
See application file for complete search history.

(56) References Cited

U.S. PATENT DOCUMENTS

| 7,395,235 | B2 | 7/2008 | Dhurandhar et al. | |
|---|---|---|---|---|
| 7,603,326 | B2 * | 10/2009 | Bonabeau et al. | 706/13 |
| 8,041,545 | B2 * | 10/2011 | Sevastyanov et al. | 703/2 |
| 2004/0267679 | A1 | 12/2004 | Fromherz et al. | |
| 2007/0005313 | A1 | 1/2007 | Sevastyanov et al. | |
| 2008/0010044 | A1 | 1/2008 | Ruetsch et al. | |
| 2008/0215512 | A1 * | 9/2008 | Narzisi et al. | 706/13 |

* cited by examiner

*Primary Examiner* — Alan Chen
(74) *Attorney, Agent, or Firm* — Daniel J. Chalker; Chalker Flores, LLP

(57) ABSTRACT

A system and method for solving a set of optimization problems initializes a current region of solutions for the set of optimization problems, performs a reduction phase, and provides the optimal solutions within the current region. The reduction phase creates a random sample of points within the current region and identifies a subregion of the current region that very likely does not contain any optimal solutions. The identified subregion is then removed from the current region. If the current region does not satisfies one or more convergence criteria, the process loops back to create another random sample of points and repeats the above-described steps. If, however, the current region does satisfy the convergence criteria, the optimal solutions within the current region are provided to the output device.

29 Claims, 7 Drawing Sheets

SYSTEM AND METHOD FOR SOLVING MULTIOBJECTIVE OPTIMIZATION PROBLEMS

PRIORITY CLAIM

This patent application is a non-provisional application of U.S. patent application 61/187,798 filed on Jun. 17, 2009 entitled "System and Method for Solving Multiobjective Optimization Problems", which is hereby incorporated by reference in its entirety.

FIELD OF THE INVENTION

The present invention relates generally to the field of solving complex problems using computers and, more particularly, to a system and method for solving multiobjective optimization problems.

BACKGROUND OF THE INVENTION

For minimization problems involving vectors of objective functions, a Pareto optimal point is a solution whose associated vector of objective function values cannot be uniformly improved upon by any other point. Finding Pareto optimal solutions is particularly difficult when the functions are not continuous and have local minima, and when the computation of function values is time-consuming or costly.

The problem of determining the set of all Pareto optimal points traditionally has been important for many scientific disciplines, for example, economics, finance, telecommunication, and electrical engineering. In recent years, several new application fields have emerged. For example, the detection of Pareto optimal regions has become increasingly important in aeronautical as well as structural mechanical design, and in computational fluid dynamics; see for example (Thévenin and Janiga, 2008). In that setting, genetic algorithms are typically used for solving multi-objective optimization problems. Extensive computational tests have established that these methods perform well, but also require a large number of function evaluations. If the function evaluation subproblem is computationally expensive, applicability of the algorithms is limited.

Problem Definition: Let X be an axis-parallel rectangle, for short rectangle, of n-dimensional Euclidean space $E^n$; that is, for some n-dimensional vectors l and u satisfying $l \leq u$, $X = \{x | l \leq x \leq u\}$. Define $f(x)$ to be an m-dimensional vector where the kth entry is a function $f_k(x)$ from X to the line $E^1$. Now find the Pareto optimal set $X^*$ for the minimization of $f(x)$ over X, that is, $$X^* = \{x^* \in X | \forall x \in X (f(x) \leq f(x^*) \Rightarrow f(x) = f(x^*))\}$$

If m=1, then $f(x)$ is a scalar, and $X^*$ is the set of vectors $x^*$ minimizing the function over X.

There are numerous prior approaches and methods for solving the stated problem under various assumptions. For an overview, see (Coello Coello et al, 1996). For many real-world problem instances, the function $f(x)$ may not be continuous and may have local minima. In such cases, deterministic techniques tend to be ineffective, and stochastic optimization methods such as Simulated Annealing (Kirkpatrick et al, 1983), Monte Carlo methods (Robert and Casella, 2004), Tabu Search (Glover and Laguna, 1997), and Evolutionary Computation (Bäck, 1996; Goldberg, 1989) seem more appropriate.

As a result of the foregoing, there is a need for an alternative approach where fewer function evaluations are needed.

SUMMARY OF THE INVENTION

The present invention provides a novel heuristic solution algorithm called POLYSEP that uses concepts of Stochastic Search, Machine Learning, and Convex Analysis to solve multiobjective optimization problems where functions specified by black boxes are to be minimized. It computes separating polyhedra that likely do not contain optimal points and therefore can be excluded from the search space. Recursive computation of separating polyhedra eventually reduces the search to a region in which optimal solutions can be identified and clustered into solution rectangles. POLYSEP is of particular interest for problems where the functions to be minimized are not given explicitly, but can only be obtained via a time-consuming or costly black box.

The present invention provides a method for solving a set of optimization problems in which a current region of solutions for the set of optimization problems is initialized, a reduction phase is performed, and the optimal solutions within the current region are provided to the output device. The reduction phase creates a random sample of points within the current region. A subregion of the current region is identified that very likely does not contain any optimal solutions based on these criterion: (1) all the randomly sampled points within the subregion (i) are non-optimal solutions to the set of optimization problems, and (ii) have a common characteristic that is not an effect of the random sampling, and (2) all points within the subregion have the common characteristic. The identified subregion is then removed from the current region. If the current region does not satisfies one or more convergence criteria, the process loops back to create another random sample of points and repeats the above-described steps. If, however, the current region does satisfy the convergence criteria, the optimal solutions within the current region are provided to the output device. This method can be implemented using a computer program embodied on a computer readable medium that is executed by one or more processors wherein each step is executed by one or more code segments.

In addition, the present invention provides a method for solving a set of optimization problems in which a current region of solutions for the set of optimization problems is initialized, a reduction phase is performed, a partition phase is performed, and a compact approximate description of the solution space (the optimal solutions within the current region) is provided to the output device. The reduction phase creates a random sample of points within the current region. The random sampled points are adjusted based on one or more previously identified and removed subregions. A subregion of the current region is identified that very likely does not contain any optimal solutions based on these criterion: (1) all the randomly sampled points within the subregion (i) are non-optimal solutions to the set of optimization problems, and (ii) have a common characteristic that is not an effect of the random sampling, and (2) all points within the subregion have the common characteristic. The identified subregion is then removed from the current region. If the current region does not satisfies one or more convergence criteria, the process loops back to create another random sample of points and repeats the above-described steps. If, however, the current region does satisfy the convergence criteria, the partition phase is performed. The partition phase determines a characterization of the points within the current region that (1) applies to all optimal and near optimal points, and (2) does not apply to the nonoptimal points, and derives a compact approximate description of a solution space from the characterization. Thereafter, the compact approximate description of the solution space is provided to the output device. This method can be implemented using a computer program embodied on a computer readable medium that is executed by one or more processors wherein each step is executed by one or more code segments.

Moreover, the present invention provides a method for solving a set of optimization problems in which a current region of solutions for the set of optimization problems is initialized, a reduction phase is performed, a partition phase is performed, and a compact approximate description of the solution space (the optimal solutions within the current region) is provided to the output device. The reduction phase creates a random sample of points within the current region. The random sample of points is created using an unbiased random process, a biased random process, a single-variable inequities process, a shrinking a search rectangle process, a divide-and-conquer process, or a combination thereof. Next, h(x) is computed for each x ∈ S using $$f_k^{min} = \min\{f_k(x) | x \in \overline{S}\}$$

$$f_k^{max} = \max\{f_k(x) | x \in \overline{S}\}$$

$$g_k(x) = \begin{cases} \frac{(f_k(x) - f_k^{min})}{(f_k^{max} - f_k^{min})}, & x \in \overline{S} \quad \text{and} \quad f_k^{max} > f_k^{min} \\ 0, & x \in \overline{S} \quad \text{and} \quad f_k^{max} = f_k^{min} \\ 1, & x \in (S - \overline{S}) \end{cases}$$

$$d(x, y) = \max_k [g_k(x) - g_k(y)], y \in S \text{ and } x \text{ and } y \text{ are comparable}$$

$$h(x) = \max_{y \in S} \{d(x, y) | x \text{ and } y \text{ are comparable}\}$$

where: $\overline{S}$ contains the x ∈ S for which all entries $f_k(x)$ of $f(x)$ are finite,
for each index k, $1 \leq k \leq m$, $0 g_k(x) \leq 1$,
$0 \leq d(x, y) \leq 1$,
d(x,x)=0, and
x ∈ S and y ∈ S are comparable if $g(x) \geq g(y)$.

A reduction phase separate process is performed to identify a subregion that very likely does not contain any optimal solutions. The identified subregion is then removed from the current region. If the current region does not satisfies one or more convergence criteria, the process loops back to to create another random sample of points and repeats the above-described steps. If, however, the current region does satisfy the convergence criteria, the partition phase is performed.

The reduction phase separate process selects a set of α and β pairs where $0 < \alpha < \beta < 1$ and α is not small. A first α and β pair is selected and a set $S_\alpha^-$ and $S_\beta^+$ are determined using $$S_\alpha^- = \{x \in S | h(x) < \alpha\}$$

$$S_\beta^+ = \{x \in S | h(x) > \beta\}.$$

If one or more termination criteria are not satisfied, $S_\alpha^-$ and $S_\beta^+$ are discretized and a training set A and a training set B are obtained. One or more disjunctive normal form (DNF) formulas that separate the sets A and B are computed. A polyhedron $P_{\alpha,\beta}$ and an associated significance $q_{\alpha,\beta}$ are defined from the DNF formulas, and the sets $S_\alpha^-$ and $S_\beta^+$ are expanded. Thereafter, the process repeats to determine whether the termination criteria are satisfied. If, however, the termination criteria are satisfied, and all the α and β pairs have not been processed, the next α and β pair are selected and the process loops back to determine new sets $S_\alpha^-$ and $S_\beta^+$ and repeat the steps previously described. If, however, all the α and β pairs have been processed, the α and β pair having a highest significance is selected, the associated polyhedron $P_{\alpha,\beta}$ is identified as the subregion to be removed, and the process returns to the reduction process. The partition phase defines a set S to consist of all x determined in the reduction phase, and computes h(x) for each x ∈ S using $$f_k^{min} = \min\{f_k(x) | x \in \overline{S}\}$$

$$f_k^{max} = \max\{f_k(x) | x \in \overline{S}\}$$

$$g_k(x) = \begin{cases} \frac{(f_k(x) - f_k^{min})}{(f_k^{max} - f_k^{min})}, & x \in \overline{S} \quad \text{and} \quad f_k^{max} > f_k^{min} \\ 0, & x \in \overline{S} \quad \text{and} \quad f_k^{max} = f_k^{min} \\ 1, & x \in (S - \overline{S}) \end{cases}$$

$$d(x, y) = \max_k [g_k(x) - g_k(y)], y \in S \text{ and } x \text{ and } y \text{ are comparable}$$

$$h(x) = \max_{y \in S} \{d(x, y) | x \text{ and } y \text{ are comparable}\}$$

where: $\overline{S}$ contains the x ∈ S for which all entries $f_k(x)$ of $f(x)$ are finite,
for each index k, $1 \leq k \leq m$, $0 \leq g_k(x) \leq 1$,
$0 \leq d(x, y) \leq 1$,
d(x,x)=0, and
x ∈ S and y ∈ S are comparable if $g(x) \geq g(y)$.
An α and β pair is selected where $0 < \alpha < \beta < 1$ and both α and β are small. A second set $S_\alpha^-$ and $S_\beta^+$ are determined using $$S_\alpha^- = \{x \in S | h(x) < \alpha\}$$

$$S_\beta^+ = \{x \in S | h(x) > \beta\}.$$

The partition phase separate process discretizes $S_\alpha^-$ and $S_\beta^+$ and obtains a second training set A and a second training set B, computes one or more second DNF formulas that separate the second sets A and B, and defines polyhedra $P^i$ corresponding to the clauses of a formula of the second DNF formulas that separate the second set A from the second set B. After the partition phase separate process is completed, sets $S^i = \{x \in S | x \in P^i\}$ are defined to complete the partition phase. Thereafter, each $S^i$ is enclosed by a rectangle $T^i$ using:

$$b_k^i = \min\{x_k | x \in S^i\}$$

$$b_k^i = \max\{x_k | x \in S^i\}$$

$$T^i = \{x | a^i \leq x \leq b^i\}.$$

A compact approximate description of the solution space is provided to the output device, wherein the compact approximate description comprises a union T of the rectangles $T^i$. This method can be implemented using a computer program embodied on a computer readable medium that is executed by one or more processors wherein each step is executed by one or more code segments.

The present also provides a system for solving a set of optimization problems in which the system includes a computer having one or more processors, a memory communicably coupled to the processors, and a communications interface communicably coupled to the processor(s). One or more output devices are communicably coupled to the processor(s) via the communications interface. An optimization target or black box is communicably coupled to the processor(s) via the communications interface. The processor(s) perform the steps described herein (e.g., FIGS. 1, 2, or 3A-B) to solve the set of optimization problems.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which.

DETAILED DESCRIPTION OF THE INVENTION

Figure 1:
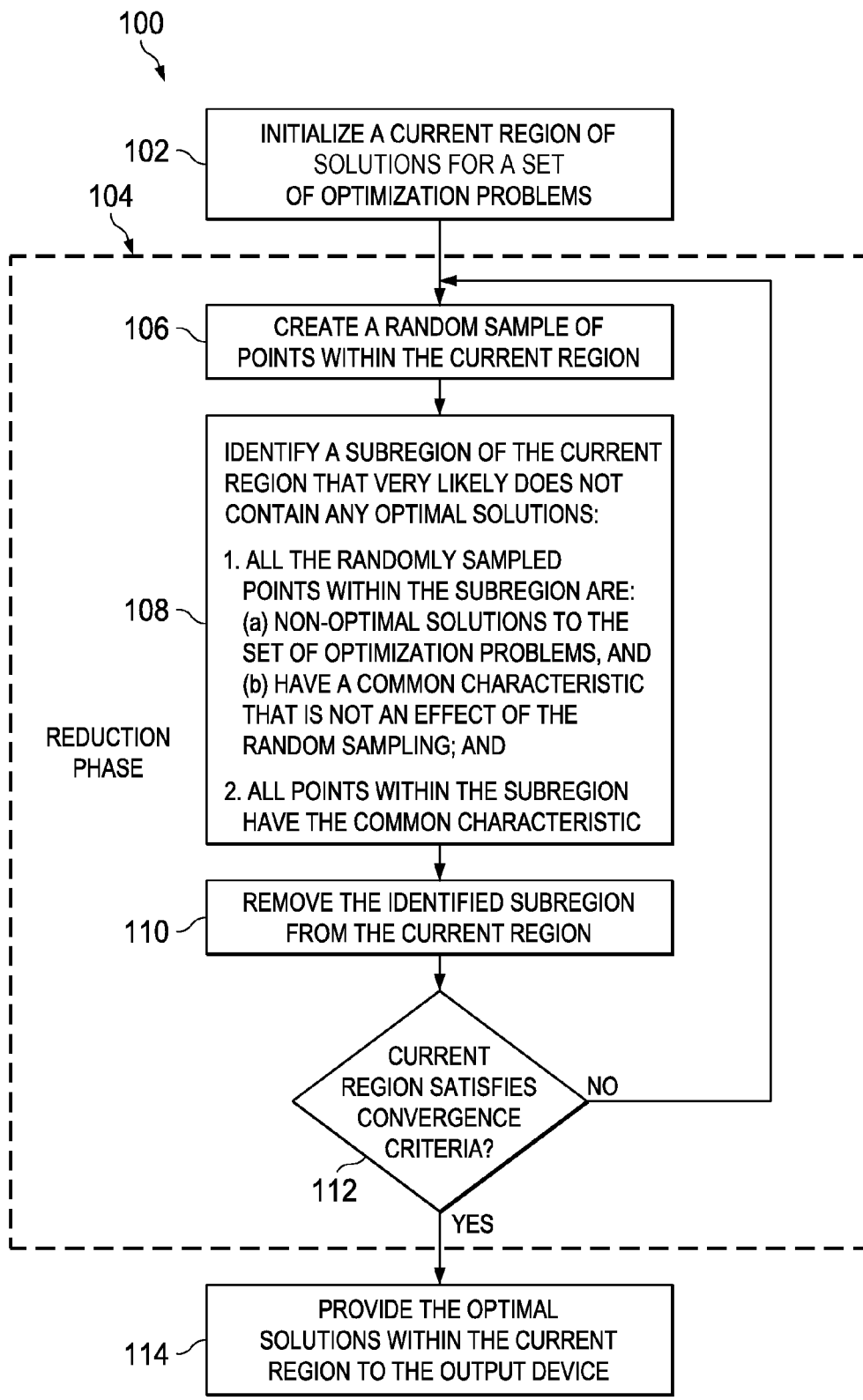
FIG. 1 is a flow chart showing a method for solving a set of optimization problems in accordance with one embodiment of the present invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

The present invention provides a novel heuristic solution algorithm called POLYSEP that uses concepts of Stochastic Search, Machine Learning, and Convex Analysis. While Stochastic Search and Convex Analysis are well known tools, the Machine Learning aspect sets POLYSEP apart from prior methods (Coello Coello et al, 1996). Specifically, a Machine Learning scheme is employed to analyze randomly generated data of the search space X and to create logic formulas that, when translated back to the search space, correspond to convex polyhedra that likely do not contain any optimal points. Accordingly, the polyhedra are removed from the search space. Once the search region has been sufficiently reduced, POLYSEP computes rectangles whose union is an approximate representation of the set of Pareto optimal solutions, again using learning of logic formulas as main procedure.

The notion of space reduction in optimization is not new. For example, it is a key concept in the branch-and-cut method of Polyhedral Combinatorics and in the metaheuristic Tabu Search (Glover and Laguna (1997)). Typically, the reduction is used in concert with an optimization or search step. In the branch-and-cut case, the step solves a linear program. In Tabu Search, the step may use a general or specialized optimization or search method; for a summarizing, intuitive discussion, see Glover (2009). What is different here is that the entire process does not explicitly perform any optimization or search at all, and that the reduction step is solely carried out by Machine Learning techniques. Indeed, any Machine Learning technique that can derive from randomly drawn samples of two populations a classification that reliably separates the two populations, is a candidate technique. Collectively, the optimization algorithms so defined constitute the class M. The members of M have the following features in common. They recursively sample the search space, identify a region that most likely does not contain any optimal points, and reduce the search space by excluding that region. Each excluded region is characterized by a polyhedron, and the approximation of the subspace of optimal points is accomplished via a union of rectangles.

The process terminates the recursive reduction steps using suitable criteria. The Machine Learning scheme produces the polyhedra and final union of rectangles via learned logic formulas, derived via certain discretization and feature selection methods. Example candidate techniques are learning of logic formulas, decision trees, support vector machines, and subgroup discovery methods. For an overview and summary of theses and additional methods for the task at hand, see Alpaydin (2004) and Mitchell (1997). A compact approximation of the subspace containing the optimal points, together with representative points in the subspace, is derived from the points sampled during the entire process,.

The methods of M are also different from the approach of Better et al. (2007) that activates a dynamic data mining procedure at certain intervals during the optimization process; the overall method continues until an appropriate termination criterion, usually based on the user's preference for the amount of time to be devoted to the search, is satisfied. In contrast, the algorithms of the class M perform no explicit optimization, and termination is controlled by criteria that tightly limit the total number of function evaluations.

The difficult goal of minimizing the number of function evaluations is approximately attained by POLYSEP by judicious reuse of data. If done without safeguards, such reuse tends to introduce unwanted dependence of decisions concerning, for example, the significance of results or the termination of steps. POLYSEP overcomes this difficulty by introducing several Alternate Random Processes, for short ARPs, into the computation of decisions. Generally, the evaluation of ARPs leads to an assessment of the relative significance of results in the same way that the analysis of alternate hypotheses in Statistics supports statistical significance claims. The notion of ARP is related to the concept of randomization testing (Jensen (1992)), where an empirical distribution of a statistic under a null hypothesis $H_0$ is constructed by evaluation of random samples. The distribution is used to estimate the probability of a given result under $H_0$. Randomization testing and the ARPs used here differ in that the former process constructs empirical distributions, while the ARPs are models of stochastic processes that are a priori specified except for some parameters whose values are readily available or obtained by simple computation.

As will be described in more detail below, POLYSEP has been applied to some standard test problems and a turbulent channel flow problem. In the latter problem, five parameters of the so-called k–ω engineering turbulence model from Wilcox for Reynolds-Averaged Navier-Stokes (RANS) equations are to be selected. For comparison, the state-of-the-art genetic algorithm NSGA-II is also applied. For each of the test problems, POLYSEP requires evaluation of substantially fewer points. Such performance is not so interesting when the time or cost for function evaluations is very low. That assessment changes when the cost or time of function evaluations is significant. For example, for the turbulent channel flow problem, POLYSEP evaluates 289 points, while the genetic algorithm NSGA-II requires 4800 points. The time required for one function evaluation is about 12 seconds. Accordingly, the total run time for function evaluations and optimization is about 1 hour for POLYSEP and 16 hrs for NSGA-II.

Now referring to FIG. 1, a flow chart showing a method 100 for solving a set of optimization problems in accordance with one embodiment of the present invention is shown. A current region of solutions for the set of optimization problems is initialized in block 102, a reduction phase 104 is performed, and the optimal solutions within the current region are provided to the output device in block 106. The reduction phase 104 creates a random sample of points within the current region in block 106. The random sample of points is created using an unbiased random process, a biased random process, a single-variable inequities process, a shrinking a search rectangle process, a divide-and-conquer process, or a combination thereof. A subregion of the current region is identified in block 108 that very likely does not contain any optimal solutions based on these criterion: (1) all the randomly sampled points within the subregion (i) are non-optimal solutions to the set of optimization problems, and (ii) have a common characteristic that is not an effect of the random sampling, and (2) all points within the subregion have the common characteristic. The subregion is identified using one or more support vector machines, one or more decision trees, one or more learning logic formulas or rules, one or more subgroup discovery methods, or a combination thereof. The identified subregion is then removed from the current region in block 110. If the current region does not satisfies one or more convergence criteria, as determined in decision block 112, the process loops back to block 106 to create another random sample of points and repeats the above-described steps. If, however, the current region does satisfy the convergence criteria, as determined in decision block 112, the optimal solutions within the current region are provided to the output device in block 106. The one or more convergence criteria include a significance criterion, a volume reduction criterion, a reduction factor criterion, a number of rounds, a number of function evaluations, an efficiency of the step of creating the random sample of points, the subregion cannot be identified, any Machine Learning technique that can derive from randomly drawn samples of two populations a classification that reliably separates the two populations, or a combination thereof or a combination thereof. This method can be implemented using a computer program embodied on a computer readable medium that is executed by one or more processors wherein each step is executed by one or more code segments.

Figure 2:
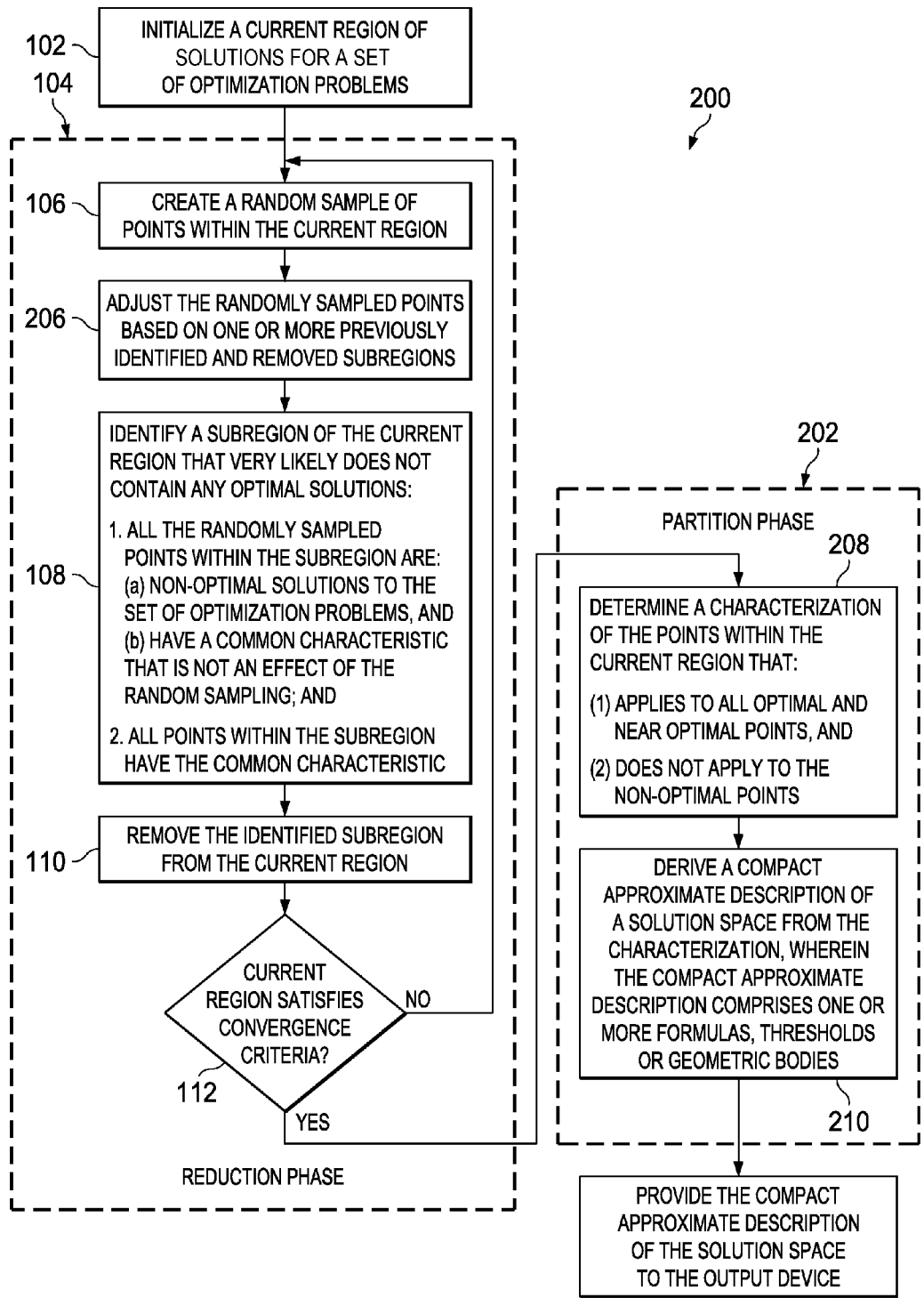
FIG. 2 is a flow chart showing a method for solving a set of optimization problems in accordance with another embodiment of the present invention.

Referring now to FIG. 2, a flow chart showing a method 200 for solving a set of optimization problems in accordance with another embodiment of the present invention is shown. A current region of solutions for the set of optimization problems is initialized in block 102, a reduction phase 104 is performed, a partition phase 202 is performed, and a compact approximate description of the solution space (the optimal solutions within the current region) is provided to the output device in block 204. The reduction phase 104 creates a random sample of points within the current region in block 106. The random sample of points is created using an unbiased random process, a biased random process, a single-variable inequities process, a shrinking a search rectangle process, a divide-and-conquer process, or a combination thereof. The random sampled points are adjusted based on one or more previously identified and removed subregions in block 206. A subregion of the current region is identified in block 108 that very likely does not contain any optimal solutions based on these criterion: (1) all the randomly sampled points within the subregion (i) are non-optimal solutions to the set of optimization problems, and (ii) have a common characteristic that is not an effect of the random sampling, and (2) all points within the subregion have the common characteristic. The subregion is identified using one or more support vector machines, one or more decision trees, one or more learning logic formulas or rules, one or more subgroup discovery methods, or a combination thereof. The identified subregion is then removed from the current region in block 110. If the current region does not satisfies one or more convergence criteria, as determined in decision block 112, the process loops back to block 106 to create another random sample of points and repeats the above-described steps. If, however, the current region does satisfy the convergence criteria, as determined in decision block 112, the partition phase 202 is performed. The one or more convergence criteria include a significance criterion, a volume reduction criterion, a reduction factor criterion, a number of rounds, a number of function evaluations, an efficiency of the step of creating the random sample of points, the subregion cannot be identified, any Machine Learning technique that can derive from randomly drawn samples of two populations a classification that reliably separates the two populations, or a combination thereof or a combination thereof The partition phase 202 determines a characterization of the points within the current region that (1) applies to all optimal and near optimal points, and (2) does not apply to the nonoptimal points in block 208, and derives a compact approximate description of a solution space from the characterization in block 210. The compact approximate description can be one or more formulas, thresholds or geometric bodies. Thereafter, the compact approximate description of the solution space is provided to the output device in block 204. The compact approximate description may include a union of rectangles. This method can be implemented using a computer program embodied on a computer readable medium that is executed by one or more processors wherein each step is executed by one or more code segments.

The solution for solving multi-objective optimization problems provided by the present invention will now be described in much more detail.

Problem Definition: Let X be an axis-parallel rectangle, for short rectangle, of n-dimensional Euclidean space $E^n$; that is, for some n-dimensional vectors l and u satisfying $l \leq u$, $X = \{x | l \leq x \leq u\}$. Define $f(x)$ to be an m-dimensional vector where the kth entry is a function $f_k(x)$ from X to the line $E^1$. Now find the Pareto optimal set X* for the minimization of $f(x)$ over X, that is, $$X^* = \{x^* \in X | \forall x \in X [f(x^*) \leq f(x^*) \Rightarrow f(x) = f(x^*)]\} \quad (1)$$

If m=1, then $f(x)$ is a scalar, and X* is the set of vectors x* minimizing the function over X.

Specifically, each component function $f_k(x)$ of $f(x)$ need not have any convexity property and may not be differentiable or even continuous. In addition, the condition may be imposed that on a proper subset $\overline{X}$ of X, each component $f_k(x)$ of $f(x)$ takes on the value ∞. The condition is useful, for example, when simulation is employed to compute $f(x)$ and when the process may not converge; the set $\overline{X}$ contains the cases of nonconvergence. As a second example, the set $\overline{X}$ may represent a region of points of X that are not allowed in X* due to side constraints. Although the condition involving $\overline{X}$ can be generalized by allowing $f(x)$ cases where at least one but not all $f_k(x)$ are equal to ∞, no such x would make sense as a Pareto optimal point in most applications. As a result, it is preferable to declare that, for any such x, all $f_k(x)$ are equal to ∞.

Finally, it is assumed that the function $f(x)$ is not given by an explicit formula, and that its values are supplied by a black box in a costly or time-consuming process. For the situation of time-consuming black box calls, it is assumed that the time for the calls dominates by far the time required by the solution algorithm. Hence, for both cases, the goal can be restated as finding the Pareto optimal set $X^*$ while minimizing the total number of evaluations of $f(x)$. In summary, the problem can be stated as:

Problem PMIN: Given $X$ and $f(x)$, find the Pareto optimal set $X^*$ using a minimum number of evaluations of $f(x)$.

The POLYSEP Algorithm. The input for POLYSEP consists of the bounding vectors l and u of the rectangle X and the black box for the function $f(x)$. The algorithm consists of two phases called Reduction and Partition. During Reduction, convex polyhedral subsets $R_1, R_2, \ldots$ of X are obtained that most likely do not contain any point of the optimal set $X^*$. The computation is carried out in recursive rounds where, in the jth round, $j \geq 1$, $R_j$ is obtained from $X_{j-1} = X - \cup_{i \leq j-1} R_i$; here, $R_0 = \emptyset$ and thus $X_0 = X - R_0 = X$. Reduction stops when it is estimated that a reasonably accurate representation of the optimal set $X^*$ can be constructed from $X_j = X - \cup_{i \leq j} R_i$. The Partition phase derives such a representation in the form of a union of rectangles.

The Reduction Phase. Recall that $X = \{l \leq x \leq u\}$, $R_0 = \emptyset$, and $X_0 = X - R_0 = X$. For $j \geq 1$, round j determines $R_j$ in the following two steps from $X_{j-1} = X - \cup_{i \leq j-1} R_i$:

1. Derive a random sample S of points of $X_{j-1}$.
2. Enclose a nonempty subset of S by a polyhedron $R_j$ that likely does not intersect the optimal set $X^*$.

The computation of the random sample will now be described. Each $R_i$, $i \leq j-1$, is defined by a system of linear strict inequalities of the form $A^i x < b^i$, where the matrix $A^i$ and the vector $b^i$ have suitable dimensions. Random samples of X are drawn using the uniform distribution for each coordinate. If a sample vector x satisfies any inequality $A^i x < b^i$, then x is in the excluded region $R_i$ and thus is discarded. Otherwise x is a randomly selected point of $X_{j-1}$.

The sampling process is used to augment a set of samples left over from the previous round. In round 1, that leftover set is defined to be empty. For rounds $j \geq 2$, how the leftover set arises will be described below. Regardless of the case, the result is a random sample S of $X_{j-1}$. The desired size of S will also be described below. The black box is applied to each $x \in S$ to get the function vector $f(x)$. By the definition of the black box, the entries $f_k(x)$ of any $f(x)$, $x \in S$, are either all finite or all equal to $\infty$.

As stated, the efficiency of the sampling process declines as the volume of $X_{j-1}$ decreases. The decline of efficiency can be avoided by using a more sophisticated sampling process that includes single-variable inequalities, shrinking the search rectangle, and/or using a divide-and-conquer method.

The single-variable inequalities process will now be described. If $A^i x < b^i$ is just a single inequality of one variable, that is, for some index k and scalar a, it is equivalent to $x_k < a$ or $x_k > a$, then the points of $R_i$ from X can be excluded by strengthening the kth inequality $l_k \leq x_k \leq u_k$ of the definition $l \leq x \leq u$ of X. That is, if the inequality is $x_k < a$, replace $l_k$ by $\max\{l_k, a\}$; otherwise, $u_k$ is replaced by $\min\{u_k, a\}$. From then on, the inequality system $A^i x < b^i$ is implicitly accounted for by the reduction of the search rectangle.

The shrinking of the search rectangle process will now be described. Suppose in the sampling process for $X_j$ the ratio of the number of rejected points divided by the number of accepted points exceeds a certain threshold M. Thus, for each accepted point, at least M rejected points have been produced. For variable $x_k$, let $[l_k, u_k]$ be the interval defining the range of the variable in the current search rectangle. On the real line, place into the interval the $x_k$ values of the accepted and rejected points that have been computed in the current round. Include the leftover points of the previous rounds as accepted points. Paint the $x_k$ values of accepted points green and those of rejected points red. Let $l'_k$ (resp. $u'_k$) be the largest (resp. smallest) red value such that the closed interval $[l_k, l'_k]$ (resp. $[u'_k, u_k]$) does not contain any green value. Then replace the search interval $[l_k, u_k]$ by $[(l_k + l'_k)/2, (u_k + u'_k)/2]$. Once these computations have been carried out for all k, the reduced intervals collectively define the reduced search rectangle. The probability that the reduced search rectangle does not eliminate any point of $X_j$ should be very close to 1. At the same time, the process should be reasonably efficient. Both goals are achieved if M is chosen to be large but not huge.

The divide-and-conquer method will now be described. In tests to-date, the two modifications have sufficed to assured sampling efficiency. But in principle this may not be so when the optimal set $X^*$ has, for some indices k, points near the lower bound $l_k$ as well as points near the upper bound $u_k$ of the rectangle X, and when the parameter $\eta$ of volume reduction discussed later is very small. In such a case, a more complicated modification can be used. It is a divide-and-conquer method that interrupts Reduction and carries out Partition to break up the optimization problem into subproblems. Each rectangle found by the application of Partition is used to define a subproblem, and upon solution of the subproblems a separate step is needed to compare the solutions of the subproblems and determine the final approximation of the optimal set $X^*$ and a representative set of solutions.

The construction of the polyhedron will now be described. A subset of S is to be enclosed by a polyhedron $R_j$ that likely does not contain any point of $X^*$. To this end, a measure of Pareto nonoptimality proposed by (Koski, 1984) is computed. For the computation of the measure, $h(x)$, the normalized version $g(x)$ of $f(x)$, $x \in S$, where for all k, $0 \leq g_k(x) \leq 1$ must first be defined. The computations are as follows.

Let $\overline{S}$ contain the $x \in S$ for which all entries $f_k(x)$ of $f(x)$ are finite. In the interest of a simplified discussion, assume $\overline{S} \neq \emptyset$. For each index k, $1 \leq k \leq m$, let $$f_k^{min} = \min\{f_k(x) | x \in \overline{S}\} \qquad (2)$$

$$f_k^{max} = \max\{f_k(x) | x \in \overline{S}\} \qquad (3)$$

Define $$g_k(x) = \begin{cases} \frac{(f_k(x) - f_k^{min})}{(f_k^{max} - f_k^{min})}, & x \in \overline{S} \text{ and } f_k^{max} > f_k^{min} \\ 0, & x \in \overline{S} \text{ and } f_k^{max} = f_k^{min} \\ 1, & x \in (S - \overline{S}) \end{cases} \qquad (4)$$

The definition is not suitable for computation and is, therefore, modified in the implementation using suitable tolerances. Declare $x \in S$ and $y \in S$ to be comparable if $g(x) \geq g(y)$. For comparable x and y, define a measure $d(x,y)$ of the Pareto nonoptimality of x relative to y, by $$d(x, y) = \max_k \{g_k(x) - g_k(y)\} \qquad (5)$$

Since $0 \leq g_k(x) \leq 1$, it has $0 \leq d(x, y) \leq 1$. Also note that $d(x,x)$ is defined and equal to 0.

Finally, declare $$h(x) = \max_{y \in S}\{d(x, y) \mid x \text{ and } y \text{ are comparable}\} \quad (6)$$

By the derivation, the following holds: For all $x \in S$, $0 \leq h(x) \leq 1$; there is an $x \in S$ for which $h(x)=0$; for all $x \in S$, $h(x)>0$ implies $x \notin X^*$. Indeed, $h(x)$ measures the current Pareto nonoptimality of x relative to S (Koski, 1984; Van Veldhuizen, 1999). In the typical cases, for some $x \in S$, $h(x)=1$. The exception is covered next.

The exceptional cases are where $\overline{S}=\{x \in S | f(x) \text{ is finite}\}=\emptyset$ or where, for all $x \in S$, $h(x)=0$. In the case of $\overline{S}=\emptyset$, the size of S is increased by additional sampling. If repeated attempts still result in $\overline{S}=\emptyset$, POLYSEP declares that it cannot solve the instance, and stops. If, for all $x \in S$, $h(x)=0$, POLYSEP also increases the size of S by additional sampling. If repeated attempts still result in the same conclusion, POLYSEP assumes that the current search space contains only optimal solutions and terminates Reduction.

Let $$S_\alpha^- = \{x \in S | h(x) < \alpha\} \quad (7)$$

$$S_\beta^+ = \{x \in S | h(x) > \beta\} \quad (8)$$

Since $h(x)$ takes on the values 0 and 1 on S, both $S_\alpha^-$ and $S_\beta^+$ are nonempty. Intuitively, if $\alpha$ is small, any $x \in S_\alpha^-$ possibly is optimal or approximately optimal for PMIN. On the other hand, if $\alpha$ is not small, then every $x \in S_\beta^+$ is far from optimal for PMIN.

Suppose for some $0 < \alpha < \beta < 1$, with $\alpha$ not small, it has a polyhedron $P_{\alpha,\beta}$ that contains no point of $S_\alpha^-$ and all points of a nonempty subset $\overline{S}_\beta^-$ of $S_\beta^+$. Any point $x \in [S-(S_\alpha^- \cup S_\beta^+)]$ may or may not be in $P_{\alpha,\beta}$. $P_{\alpha,\beta}$ is called a separating polyhedron that separates $\overline{S}_\beta^+$ from $S_\alpha^-$. Since $\alpha$ is not small, $P_{\alpha,\beta}$ does not contain any point of S that possibly is optimal or approximately optimal for PMIN.

$\alpha$, $\beta$, and $P_{\alpha,\beta}$ are selected so that more is claimed; that is, the conclusion that $P_{\alpha,\beta} \cap X^*$ very likely is empty. This goal is achieved using the Algorithm SEPARATE as described in more detail below. The input for the algorithm consists of the set S and, for each $x \in S$, the measure $h(x)$ of (6). For the time being, the particulars of that algorithm are ignored in order to focus on the use of its output, which consists of (1) values $\alpha$ and $\beta$ where $0 < \alpha < \beta < 1$ and $\alpha$ is not small, (2) a polyhedron $P_{\alpha,\beta}$, and (3) a significance value $q_{\alpha,\beta}$ whose role is described below.

By the definition of $P_{\alpha,\beta}$, the inequalities of that polyhedron constitute a characterization of $\overline{S}_\beta^+$ that does not apply to $S_\alpha^-$. For each $x \in [S-(S_\alpha^- \cup S_\beta^-)]$, the characterization may or may not apply. If minimizing the total number of evaluations of $f(x)$ was not the goal, the points in $P_{\alpha,\beta}$ would be sampled to estimate the probability $r_{\alpha,\beta}$ that the polyhedron does not contain any $x \in X^*$. But due to that goal, such sampling is not used and a significance $q_{\alpha,\beta}$, $0 \leq q_{\alpha,\beta} \leq 1$, for $P_{\alpha,\beta}$ using algorithm SEPARATE is computed instead. The significance is defined via a certain postulated random process, such as ARP, involving $X_{j-1}$ and $P_{\alpha,\beta}$, and its evaluation does not involve any sampling. The significance $q_{\alpha,\beta}$ is used as if it were the probability $r_{\alpha,\beta}$. That is, the higher the value, the more it is believed that $P_{\alpha,\beta}$ does not contain any $x \in X^*$. Accordingly, algorithm SEPARATE searches for $0 < \alpha < \beta < 1$, with $\alpha$ not small, so that $q_{\alpha,\beta}$ is maximized. The results of that search are denoted by $\tilde{\alpha}$, $\tilde{\beta}$, $\tilde{P}=P_{\tilde{\alpha},\tilde{\beta}}$ and $\tilde{q}=q_{\tilde{\alpha},\tilde{\beta}}$.

If $\tilde{q}$ is at or above a certain threshold (e.g., reasonably close to 1), $\tilde{P}$ is declared to be the desired $R_j$, $S-R_j$ is defined to be the set of leftover samples of round j, and round j+1 is begun. If $\tilde{q}$ is below the threshold (e.g., not reasonably close to 1), or if the algorithm SEPARATE concludes for various other reasons that it cannot determine a separating polyhedron, or if certain criteria defined via the volume of the search space are satisfied, then the Reduction process is terminated. The termination criteria and related actions based on convergence measures will be described below.

The Partition Phase. Redefine S to be the union of the sample sets employed in rounds 1, 2, . . . , j. Below, Partition deduces in three steps from S a union of rectangles that approximately represents $X^*$. Statements in parentheses are informal explanations.

1. For each $x \in S$, compute $h(x)$ of (6) via (2)-(5).
2. Using a small $\alpha > 0$, say $\alpha = 10^{-4}$, and a somewhat larger but still small $\beta$ that is a user-defined tolerance value for optimality, say $\beta = 10^{-2}$, determine $S_\alpha^-$ and $S_\beta^+$ of (7) and (8). With a variation of the method employed in Reduction, find a small number of convex polyhedra $P^i$ such that (1) every $P^i$ is defined by a system of strict inequalities each of which involves just one variable, and (2) $\cup_i P^i$ contains all points of $S_\alpha^-$ and no point of $S_\beta^+$.
   (Due to the choice of $\alpha$ and $\beta$, the set $\cup_i P^i$ could be claimed to be an approximate representation of the optimal $X^*$. Generally, that representation is unsatisfactory since it does not explicitly account for X. The next step produces an alternate representation that avoids that objection. The step uses the $P^i$ to define clusters of optimal or approximately optimal points and derives from those clusters rectangles whose union is an approximation of $X^*$.)
3. For each i, define $S^i = \{x \in S | x \in P^i\}$. (The $S^i$ are the clusters.) Enclose each $S^i$ by a rectangle $T^i$:
   Let $a^i$ and $b^i$ be the vectors whose elements are specified by $$a_k^i = \min\{x_k | x \in S^i\} \quad (9)$$

$$b_k^i = \max\{x_k | x \in S^i\} \quad (10)$$

Define rectangle $T^i$ by $$T^i = \{x | a^i \leq x \leq b^i\} \quad (11)$$

Output the union T of the rectangles $T^i$ as an approximate representation of the optimal set $X^*$. Also output the union of the clusters $S^i$ as a representative set of samples of T.

The union T of the rectangles $T^i$ produced by the above process is a biased estimate of $X^*$, since it tends to underestimate $X^*$. A more elaborate procedure that results in an unbiased estimate will be described below. This section also specifies a reduction of the input set S of Step 1 of Partition that makes the process computationally more efficient.

The SEPARATE Algorithm. Algorithm POLYSEP invokes Algorithm SEPARATE in Reduction and Partition. The computations performed by Algorithm SEPARATE for the Partition case are a subset of those done for the Reduction case.

SEPARATE Algorithm for Reduction. Recall that the input of Algorithm SEPARATE consists of a set S of vectors $x \in X$ and associated values $h(x)$ of (6). In the Reduction case, Algorithm SEPARATE outputs a case of values $\alpha$ and $\beta$ where $0 < \alpha < \beta < 1$ and where $\alpha$ is not small, (2) a polyhedron $P_{\alpha,\beta}$, and (3) a significance value $q_{\alpha,\beta}$ that is the maximum value resulting from trials involving some $\alpha$ and $\beta$ pairs selected by systematic sampling of the region of interest. The computation of $P_{\alpha,\beta}$ and $q_{\alpha,\beta}$ for one pair $\alpha$ and $\beta$ is discussed below. As before, define sets $S_\alpha^-$ and $S_\beta^+$ via (7) and (8).

Algorithm SEPARATE is recursive. The iterations are called stages and are numbered 0, 1, . . . Since Algorithm SEPARATE is rather complex, an overview of the stages is provided first with the details described later.

In Stage 0, the algorithm discretizes the sets $S_\alpha^-$ and $S_\beta^+$, say resulting in sets A and B. Each entry of the vectors of A or B is one of the logic constants True and False, or is an exceptional value called Unavailable that will be ignored for the moment. The vectors of A and B are called logic records. The algorithm derives from the logic records of A and B propositional logic formulas that, roughly speaking, evaluate to True on the records of one of the two sets and to False on the other one. The logic formulas separate the training sets A and B. Each propositional formula is in disjunctive normal form (DNF); that is, each formula is a disjunction of DNF clauses which in turn are conjunctions of literals. For example, $(z_1 \wedge z_2 \wedge \neg z_3) \vee (\neg z_2 \wedge z_4)$ is a DNF formula with DNF clauses $z_1 \wedge z_2 \wedge \neg z_3$ and $\neg z_2 \wedge z_4$; the literals are the terms in the clauses such as $z_1$ and $\neg z_2$. From the formulas, the algorithm derives a polyhedron $P_{\alpha,\beta}$ that separates a nonempty subset $\overline{S}_\beta^+$ of $S_\beta^+$ from $S_\alpha^-$, together with an associated significance $q_{\alpha,\beta}$. The polyhedron is rectangular, so the defining inequality system Dx<e has one nonzero coefficient in each row of the matrix D.

In each subsequent Stage $k \geq 1$, the sets $S_\alpha^-$ and $S_\beta^+$ of the preceding stage are modified in a certain way. Generally speaking, the change adjoins to the vectors of $S_\alpha^-$ and $S_\beta$ additional entries that are linear combinations of existing vector entries. This step is called an expansion of the sets $S_\alpha^-$ and $S_\beta^+$ since it corresponds to an increase of the dimension of the underlying space. Then the above operations are carried out for the updated $S_\alpha^-$ and $S_\beta^+$. The resulting polyhedron, which resides in the expanded space, is rectangular. But projection into the original space results in a polyhedron that is no longer rectangular. Indeed, for Stage k, let Dx<e describe the latter polyhedron. Then the number of nonzero coefficients in any row of D can be as large as $2^k$.

The recursive process stops when any one of several termination criteria is satisfied. At that time, the algorithm outputs the polyhedron with highest significance found during the processing of stages. The steps are summarized below.

SEPARATE Algorithm for Reduction.
1. Select some α and β pairs where 0<α<β<1 and α is not small. For each of the selected pairs, do Steps 2-7. When all pairs have been processed, go to Step 8.
2. Determine $S_\alpha^-$ and $S_\beta^+$ via (7) and (8). Initialize stage number k=0.
3. If any one of several termination criteria are met, processing of the pair of α and β is completed.
4. Discretize $S_\alpha^-$ and $S_\beta^+$, getting training sets A and B.
5. Compute DNF formulas that separate A and B.
6. Derive from the DNF formulas a polyhedron $P_{\alpha,\beta}$ and associated significance $q_{\alpha,\beta}$. The polyhedron separates a nonempty subset $\overline{S}_\beta^+$ of $S_\beta^+$ from $S_\alpha^-$.
7. Expand the sets $S_\alpha^-$ and $S_\beta^+$, increment k by 1, and go to Step 3.
8. From the polyhedra defined in Step 6 for various pairs α and β and various stages, select one with highest significance. Tie breakers are, in order, a smaller stage number, a larger α value, and a larger β value.

The details of Steps 4-7 are described in detail below.

Step 4—Discretization. This section covers Step 4 of Algorithm SEPARATE. For a given numerical attribute, discretization generally introduces cutpoints and declares the logic variable associated with a cutpoint to have the value False (resp. True) if the attribute value is less (resp. greater) than the cutpoint. But, what happens when the variable has the cutpoint as value? The answer is that a special value called Unavailable is declared to be the discretized value. Unavailable has the effect that, when it is assigned to a variable of a conjunction of a DNF formula, then that conjunction evaluates to False.

There are numerous discretization methods; for an overview, see Jin et al. (2007). Here, the method of Bartnikowski et al. (2006) is used; see also Mugan and Truemper (2007) for preliminary computational results for the method. The scheme looks for cutpoints surrounded by patterns that are unlikely to have been produced by a certain random process. Although the cited references do not use the term, that random process is an ARP which is particularly helpful when data sets are small, as is the case here.

Steps 5 and 6—Learning Formulas. This section provides details of Steps 5 and 6 of Algorithm SEPARATE. Suppose the sets $S_\alpha^-$ and $S_\beta^+$ have been discretized. In Step 5, logic formulas that separate the resulting training sets A and B are learned in a somewhat complicated process. A basic algorithm in the process is the Lsquare method of Felici and Truemper (2002); see also Felici et al. (2006). Alternately, the following methods could be used as a basic scheme: Kamath et al. (1992); Triantaphyllou (2008); Triantaphyllou et al. (1994). For present purposes, the fact that Lsquare produces two DNF formulas $f_A$ and $f_B$ is used. The formula $f_B$ outputs the value False for all records of the set A and the value True for as many records of the set B as possible. The formula $f_A$ is like $f_B$ except that the roles of True and False trade places. Finally, the formulas are so selected that each of the clauses uses few literals.

A rather complicated process described in detail in Riehl and Truemper (2008) uses the above discretization process and Lsquare repeatedly, together with an ARP, to obtain significance values for each attribute. Then the process: (1) eliminates all attributes of $S_\alpha^-$ and $S_\beta^+$ that according to a threshold are insignificant, getting sets $S'^+_\alpha$ and $S'^+_\beta$; (2) discretizes the reduced sets getting training sets A' and B'; (3) applies Lsquare to A' and B' getting DNF logic formulas $f_{A'}$ and $f_{B'}$ that evaluate A' and B' analogously to $f_A$ and $f_B$ for A and B; (4) assigns significance values to the DNF clauses of $f_{B'}$ using yet another ARP; and (5) selects the most significant clause C of $f_{B'}$, say with significance $q_C$. The clause C evaluates to False on all records of A' and to True on a nonempty subset of B', say $\overline{B'}$.

The ARP used for the determination of the significance of the clauses of $f_{B'}$ is not described in the cited references, so it will now be described. Take any clause of $f_{B'}$. Using an estimate p of the prior probability that the clause evaluates to True on a randomly generated record, the ARP is defined to be the Bernoulli process that randomly generates records in such a way that a record satisfies the clause with probability p. Suppose the clause evaluates to True on m' records of B'. The probability q that the ARP produces at least m' records satisfying the clause, out of a total of |B'| records is computed. If q is small, then the frequency with which records satisfying the clause occur in B', are judged to be unusual. A measure of the unusualness is 1−q, which is declared to be the significance of the clause. Clause significance is related to the Machine Learning concept of sensitivity of the clause, which in the present situation is the ratio m'/|B'|.

The clause significance and the goal of finding a polyhedron that likely has empty intersection will be linked with the optimal set X*. For that discussion, a polyhedron must first be constructed from the selected clause C.

Due to the discretization, each literal of the clause C corresponds to a strict linear inequality of one variable, and the clause itself corresponds to a polyhedron. For example, suppose the clause C is $z_1 \wedge \neg z_2$. Assume that the discretization of variables $x_1$ and $x_2$ of the sets $S'_\alpha{}^-$ and $S'_\beta{}^-$ has produced cutpoints $c_1$ and $c_2$ defining the logic variables $z_1$ and $z_2$. Thus, $x_1 < c_1$ (resp. $x_1 > c_1$) corresponds to $z_1$=True (resp. $z_1$=False). The corresponding statement holds for $z_2$ and $x_2$. Using these relationships, the clause $z_1 \wedge \neg z_2$ is converted to the equivalent statement $(x_1 > c_1) \wedge (x_2 < c_2)$. The latter formula evaluates to True if and only if the vector x is in the polyhedron $P=\{x | x_1 > c_1; x_2 < c_2\}$. Indeed, going back to the original sets $S_\alpha{}^-$ and $S_\beta{}^+$, the following is know. All points of $S_\alpha{}^-$ are outside P, and a nonempty subset of $S_\beta{}^+$, say $\overline{S}_\beta{}^+$, is contained in P. If P was produced in Stage k=0, then P is declared to be the desired polyhedron $P_{\alpha,\beta}$. Otherwise, P is first projected into the original space as described below with respect to Step 7, and the resulting polyhedron is taken to be $P_{\alpha,\beta}$. In either case, the significance of clause C is declared, as defined above via the ARP, to be the significance $q_{\alpha,\beta}$ associated with the polyhedron $P_{\alpha,\beta}$. The above discussion is readily expanded to cover the general case, by considering a clause with any number of literals and creating for each literal a strict inequality for the definition of the polyhedron P.

It can now be argued that, the higher the significance $q_{\alpha,\beta}$, the more it is justified to believe that $P_{\alpha,\beta}$ does not contain any point of X*. Since $0 < \alpha < \beta$ and $\alpha$ is not small, $\beta$ is not small either. All points of $\overline{S}_\beta{}^+$ which are the points of S occurring in the polyhedron $P_{\alpha,\beta}$, have $h(x) > \beta$ and thus are far from being optimal. Suppose the significance $q_{\alpha,\beta}$ of $P_{\alpha,\beta}$ is high. Due to the evaluation via the ARP, it is known that the characteristic of $\overline{S}_\beta{}^+$ as expressed by the clause C, likely isn't just a random effect. Due to that fact, it is plausible to conjecture that the characteristic is present in the points of $\overline{S}_\beta{}^+$ and absent from all points of $S_\alpha{}^-$ because the characteristic induces nonoptimality. The conjecture can be restated as: $P_{\alpha,\beta}$ does not contain any point of the optimal set X*. Note that the closer the significance $q_{\alpha,\beta}$ is to 1, the more credible the conjecture becomes. This fact was stated earlier somewhat loosely by saying that $q_{\alpha,\beta}$ is used as if it were the probability that the polyhedron $P_{\alpha,\beta}$ does not contain any point $x \in X^*$.

Step 7—Space Expansion. Recall from above that Step 5 of Algorithm SEPARATE selects significant attributes using the records of the sets $S_\alpha{}^-$ and $S_\beta{}^+$. The expansion process of Step 7 is a somewhat simplified and differently motivated version of the RHS discretization method of Truemper (2009), which is hereby incorporated by reference in its entirety and attached hereto as Exhibit A. It carries out the following procedure for each pair of significant attributes. Let $x_k$ and $x_l$ be one such pair.

Suppose just one cutpoint $c_k$ (resp. $c_l$) is used in the discretization of $x_k$ (resp. $x_l$). In the $(x_k, x_l)$-plane, the vertical line $\{(x_k, x_l) | x_k = c_k\}$ and the horizontal line $\{(x_k, x_l) | x_l = c_l\}$ together imply a partition of the plane into four regions. Suppose each point $(x_k, x_l)$ in the interior of the regions is associated with the pair of True/False values assigned by the discretization. Then within each subrectangle, all points have the same True/False pair assigned.

Assume that it is desirable to refine the discretization by a further partitioning of the four regions, using a few, in fact just two, lines. A simple approach for selecting the two lines is described. It analyzes the structure of the points near the vertical and horizontal lines defined by $x_k$ and $x_l$, as follows. Let $a_k^1$ be the smallest $x_k$ value of the vectors of $S_\alpha{}^- \cup S_\beta{}^+$ that is larger than $c_k$, and define $a_k^2$ to be the largest $x_k$ value of the vectors of $S_\alpha{}^- \cup S_\beta{}^+$ that is smaller than $c_k$. In the discretization process, $c_k$ is the midpoint between $a_k^1$ and $a_k^2$. Define $u_k = a_k^1 - a_k^2$ to be the uncertainty width for $x_k$. Analogously define the uncertainty width $u_l$ for $x_l$. The two widths are used to define two strips in the Euclidean $(x_k, x_l)$-plane: the vertical strip $\{(x_k, x_l) | c_k - u_k/2 \leq x_k \leq c_k + u_k/2\}$ corresponding to the cutpoint $c_k$ and the horizontal strip $\{(x_k, x_l) | c_l - u_l/2 \leq x_l \leq c_l + u_l/2\}$ corresponding to $c_l$. It is easy to see that the interior of each strip does not contain any point of $S_\alpha{}^- \cup S_\beta{}^+$. Thus, when the interiors of the two strips are removed from the plane, four disjoint regions are obtained that contain all projected points of $S_\alpha{}^- \cup S_\beta{}^+$. Two lines that simultaneously subdivide each of the four regions into two subregions are now introduced. Let R be the rectangle defined by the intersection of the two strips. The two lines are defined based on the following argument. The cutpoints $c_k$ and $c_l$ were selected based on patterns near these points. Accordingly, lines that go through the point $(c_k, c_l)$ and subdivide the subregions near that point are desired. That goal is achieved by choosing the two lines so that they contain the diagonals of R. Using the four corner points of R, which are given by $(c_k \pm u_k/2, c_l \pm u_l/2)$, the equations of the two lines are readily derived. Indeed, for some constants $a_1$ and $a_2$, the equations are $$x_k/u_k + x_l/u_l = a_1$$

$$x_k/u_k - x_l/u_l = a_2 \tag{12}$$

The discretization of $x_k$ and $x_l$ could be revised directly using these two lines. More effective is the following approach, which momentarily considers $a_1$ and $a_2$ to be undecided, and which defines two variables $y^+$ and $y^-$ by $$y^+ = x_k/u_k + x_l/u_l$$

$$y^- = x_k/u_k - x_l/u_l \tag{13}$$

These two variables are added as new attributes to each vector of $S_\alpha{}^-$ and $S_1{}^+$, and values for them are computed by inserting the values for $x_k$ and $x_l$ into the defining equations of (13).

Due to this expansion of the space of attributes, the variables $y^+$ and $y^-$ are called expansion variables. The subsequent use of the expansion variables is determined by discretization applied to the expanded data sets. That step decides cutpoints for the expansion variables that generally may make better use, so to speak, of the expansion variables than selection of $a_1$ and $a_2$ of (12) as cutpoints.

So far it has been assumed that both $x_k$ and $x_l$ have just one cutpoint. If, for j=k or j=l, $x_j$ has several cutpoints, compute for $x_j$ the uncertainty width for each cutpoint as described above and use the average of these uncertain widths in the above calculations. When the above process has been carried out for all pairs of significant attributes, the expanded sets of Step 7 are provided.

The projection of polyhedra involving original variables and expansion variables into the original space must be covered. To this end, expansion variables are recursively replaced in the inequality system defining the polyhedron, by the right-hand-side of the defining equations of (13). Since each expansion variable is a linear combination of two other variables, an expansion variable introduced at Stage $k \geq 1$ may ultimately induce up to $2^k$ nonzero coefficients in the inequalities describing the final polyhedron.

Algorithm SEPARATE for Partition. Recall that Algorithm SEPARATE is invoked in the Partition phase to find a small number of rectangular polyhedra $P^i$ such that $\cup_i P^i$ contains most if not all points of a certain set $S_\alpha{}^-$ and no point of a second set $S_\beta{}^+$. Steps 4 and 5 of Algorithm SEPARATE are used as described above, and a modified version of Step 6, to find the polyhedra $P^i$, as follows.

The steps for the Algorithm SEPARATE for Partition are as follows:

1. Discretize $S_\alpha{}^-$ and $S_\beta{}^+$, getting training sets A and B. This step is the same as Step 4 previously described with respect to the Reduction case.

2. Compute DNF formulas that separate A and B. This step is the same as Step 5 previously described with respect to the Reduction case.
3. The formula $f_{A'}$ determined in Step 2 evaluates to False for all records of the set B' and to True for most if not all records of A'. Define the polyhedra corresponding to the clauses of $f_{A'}$ to be the $P^i$.

Computational Complexity of POLYSEP. A major goal of POLYSEP is to keep the number of function evaluations by the black box low. That goal is so important that, for its achievement, a reduced accuracy in the approximation of the optimal set X* is acceptable, provided some very good solutions are still determined. Accordingly, this section introduces several parameters and termination criteria for Reduction that together imply a polynomial-time, indeed practically efficient, performance of POLYSEP that requires few function evaluations.

Let n be the dimension of the rectangle X, and define m to be the size of the sample sets S during the rounds of Reduction.

The size of the sample sets will now be described. Based on prior experience with Algorithm SEPARATE in Machine Learning settings, m is limited so that it grows at most linearly with increasing n. On the other hand, certain features of the subroutine for learning formulas as described above with respect to Steps 5 and 6 of Algorithm SEPARATE require a minimum sample size, say τ. Thus, for some positive constant σ, $$m \leq \tau + n\sigma \quad (14)$$

is enforced.

The significance termination criterion will now be described. Recall that the significance $q_{\alpha,\beta}$ is employed in Reduction to estimate the likelihood that $P_{\alpha,\beta}$ does not contain any point of X*. If, for a bound θ fairly close to 1.0, all pairs α and β selected by POLYSEP result in $$q_{\alpha,\beta} < \theta \quad (15)$$

then Reduction is halted. If this happens after the first few rounds and the size of S is small, then the size of S is increased and the current round is resumed. Otherwise, it can be conjectured that Reduction has identified sufficient information so that Partition can construct a reasonable approximation of the optimal set X*; accordingly, Reduction is terminated.

The volume reduction termination criterion will now be described. A second termination criterion for Reduction is based on the volume reduction factor $v_j$ that estimates for round j the ratio of the volume of $X_j = X - \cup_{i \leq j} R_i$ divided by the volume of X. The factor $v_j$ is computed at the beginning of round (j+1). The stopping criterion is $$v_j \leq \eta \quad (16)$$

where the parameter η is suitably small. The criterion (16) is applied in round (j+1) as soon as $v_j$ has been computed, and prior to the function evaluations of that round. It seems reasonable that η is chosen so that it declines at most exponentially with increasing η. Thus, for some parameters 0<ζ1 and λ≥0, η is selected so that $\eta \geq \zeta^{n+\lambda}$.

The reduction factor termination criterion will now be described. Define the rate of convergence up to and including round j to be $$r_j = v_j^{1/j} \quad (17)$$

An estimate of $r_j$ can be obtained from counts of the sampling process. The estimate has too much variance to be used directly in a termination criterion. Instead, the average reduction factor $\bar{r}_j$ is utilized up to and including round j defined by $$\bar{r}_j = \left( \prod_{1 \leq i \leq j} r_i \right)^{1/j} = v_j^{1/j} \quad (18)$$

Assume that criterion (16) triggers termination, and that for a suitable δ, 0<δ<1, for all j $$\bar{r}_j \leq \delta \quad (19)$$

then the average volume reduction up to and including round j is considered insufficient, and Reduction is terminated. Since $v_j$ is computed at the beginning of round (j+1), the computation of $r_j$ and the test (19) are done at that time as well, prior to the function evaluations of that round.

The bounds for rounds and function evaluations will now be described. For any j, if Reduction does not terminate in round (j+1), then by (18), (17), and (16) it is known that $$\delta^j \geq (r_j)^j = v_j > \eta \quad (20)$$

which implies $$j < \frac{\log \eta}{\log \delta} \quad (21)$$

Thus, Reduction terminates for the latest in round (j+1) with $$j = \left\lceil \frac{\log \eta}{\log \delta} \right\rceil \quad (22)$$

For example, suppose δ=0.6 and η=10⁻³, which are typical values for the case of a low-dimensional search space X. By (15), $$j = \left\lceil \frac{\log 10^{-3}}{\log 0.6} \right\rceil = 14,$$

and Reduction terminates for the latest at the beginning of round 15.

Assume that each round reduces the volume by a factor approximately equal to δ. Using (22), the total number N of calls of the black box are estimated as follows. In round 1, m calls evaluate the initial set S. For all 2≤i≤j, in round i about δm vectors are left over from round i−1 and about (1−δ)m new vectors are added and thus evaluated by the black box. No function evaluations take place at the beginning of round (j+1). Thus, the total number of evaluations N is approximately given by $$N = \left[ 1 + \sum_{i=2}^{j} (1-\delta) \right] m \quad (23)$$
$$= [1 + (j-1)(1-\delta)] m$$
$$= \left[ 1 + \left( \left\lceil \frac{\log \eta}{\log \delta} \right\rceil - 1 \right)(1-\delta) \right] m$$

For example, suppose δ=0.6, η=10⁻³, and m=50. By (23), the total number of calls to the black box can be estimated to be $$N = \left[1 + \left(\left\lceil \frac{\log 10^{-3}}{\log 0.6} \right\rceil - 1\right)(1 - 0.6)\right]m = 310.$$

Sampling Process. Another parameter that must be controlled is the efficiency of the sampling process during Reduction. To this end, if the ratio of the number of accepted samples divided by the total number of samples in any round falls below a threshold $\gamma$, then Reduction is terminated.

Complexity. The above discussion establishes that, for constant parameters $\gamma$, $\delta$, $\zeta$, $0$, $\sigma$, and $\tau$, reduction stops after $O(n)$ rounds requiring $O(n^2)$ function evaluations. The computational effort for each round clearly is bounded by a polynomial in the encoding size of the bound vectors l and u of the rectangle X, provided that Algorithm SEPARATE runs in polynomial time. The latter requirement is easily seen to be satisfied save for the computation of DNF formulas. As described in Riehl and Truemper (2008), that computation can be carried out in polynomial time if certain linear programs (LPs) are solved with a polynomial algorithm, for example, with the ellipsoid method of Khachiyan (1979).

Note that the implementation of POLYSEP uses the simplex method in Algorithm SEPARATE, together with an appropriate perturbation scheme to handle the highly degenerate LPs. The simplex method is not polynomial, but in numerous tests over a number of years has proved to be a fast and reliable tool for the class of LPs encountered here.

Optimality. What can be said about the accuracy of the POLYSEP output? The key factor influencing accuracy is the probability that a separating polyhedron $R_j$ contains optimal points. Assessment of that probability is difficult absent assumptions about the function $f(x)$. On the other hand, if at least continuity of $f(x)$ is assumed, and if the size of the sample set i is allowed to grow depending on bounds of function variations, then the probability that $R_j$ contains optimal points can be controlled. Note that such a direction is contrary to the motivation for POLYSEP, where finding good solutions using few function evaluations is desired. The theory of VC-dimension (Vapnik (2000)) qualitatively supports the approach taken by Algorithm SEPARATE for the construction of the polyhedra $R_j$. Roughly speaking, the theory implies for the present context that polyhedra $R_j$ produced via simple logic formulas are less likely to contain optimal points than those derived from complex logic formulas, assuming that the accuracy of the formulas on the training data is similar. For definitions of the qualitative terms "simple" and "complex" and an excellent discussion of this aspect of VC-dimension, see Burges (1998).

Extensions of POLYSEP. The following extensions of POLYSEP reduce if not eliminate any computationally ineffectiveness of Reduction and Partition. The sampling process for S has already been described. So, the construction of the union of rectangles approximating the optimal set X* will be described below. The following are also described below: a generalization of problem PMIN to integer variables and conditional Pareto optimal sets, together with the corresponding extension of POLYSEP; and a version of POLYSEP for parallel processors.

Two improvements of the Partition Phase will now be described: elimination of nonoptimal points and unbiased solution rectangles. Regarding the elimination of non-optimal points, Partition applies Algorithm SEPARATE to the union S of the sample sets employed in the rounds of Reduction. Typically, the set S consists mostly of nonoptimal points. Very few of them are actually needed by Partition. In the first improvement, S is reduced as follows. The shrinking process described in reference to the sampling process is applied to S, except that the $l'_k$ and $u'_k$ values computed by the shrinking process are defined to be the bounds of the reduced rectangle. The points of S falling into the reduced rectangle plus the two points x=l' and x=u' constitute the input set for Partition.

The second improvement concerns the definition of the rectangles $T^i$ whose union approximately represents the optimal set X*. As previously stated, Partition uses Algorithm SEPARATE for this task to define clusters $S^i$ of optimal or approximately optimal points. The rectangles $T^i$ defined the Partition Phase are directly based on those clusters and tend to underestimate X*. The bias is removed using the nonoptimal points of the S that are closest to smallest rectangles containing the clusters $S^i$. Specifically, the optimal points in cluster $S^i$, the closest nonoptimal points, and the h(x) values of the latter points are used to compute an interpolated boundary of a slightly larger rectangle that is declared to be $T^i$. The union T of the $T^i$ is outputted as an approximation of the optimal set X*.

Some generalizations of Problem PMIN can be solved by suitably modified versions of POLYSEP. Two examples are described: integer variables and conditional pareto optimality. With respect to integer variables, the search space X may not be a rectangle but some other subset of $E^n$. For example, some variables may be restricted to be integer values falling into some search interval. For these variables, the sampling process of Reduction employs the discrete uniform distribution instead of the continuous one.

With respect to conditional pareto optimality, suppose a 0/1 valued function c(x,y) is defined for all x ∈ X and y ∈ X. Find the points x* such that, for all x ∈ X satisfying c(x, x*)=1, $f(x) \leq f(x^*) \Rightarrow f(x) = f(x^*)$. Thus, the conditional Pareto optimal set X* of the points x* is specified by $$X^* = \{x^* \in X | \forall x \in X[(c(x,x^*)=1 \wedge f(x) \leq f(x^*)) \Rightarrow f(x)=f(x^*)]\} \quad (24)$$

POLYSEP determines a union of rectangles approximating X* of (24), provided in the computation of h(x) of (6) via (2)-(5) the concept of comparable x and y is redefined as follows: Two points x and y are comparable if $g(x) \geq g(y)$ and c(x, y)=1. For example, compute Pareto optimal points x* that are not dominated by other points x within a specified distance d, where distance is based on a certain metric. For this case, c(x,y) is defined to be equal to 1 if the distance between x and y is at most d, and to be 0 otherwise.

Parallel Processing. The learning of formulas of Algorithm SEPARATE can be partially parallelized using up to 10 processors; see Riehl and Truemper (2008). A much more significant speedup is possible if the function evaluations are time-consuming. In a slight change of notation, let m be the minimum number of sample points needed in each round of Reduction. Suppose there are p parallel processors for function evaluation. Consider an arbitrary round. Define m' to be 0 if it is round 1, and to be the number of points left over from the previous round otherwise. If m'≥m, the set of leftover points is taken as S of the round. Otherwise, p⌈(m−m')/p⌉ additional points are generated and evaluated in parallel on the p processors, such that these points are declared together with the m' leftover points to constitute the set S for the round.

Note that the number of parallel processors p should not be chosen much larger than m. Indeed, if p is much larger than m, a number of successive rounds may use only leftover points. As a result, the computations of these rounds are not longer based on independent samples, so the underlying assumptions for the learning of formulas and construction of separating polyhedra no longer hold, and the polyhedra may well contain optimal points.

Figure 3A:
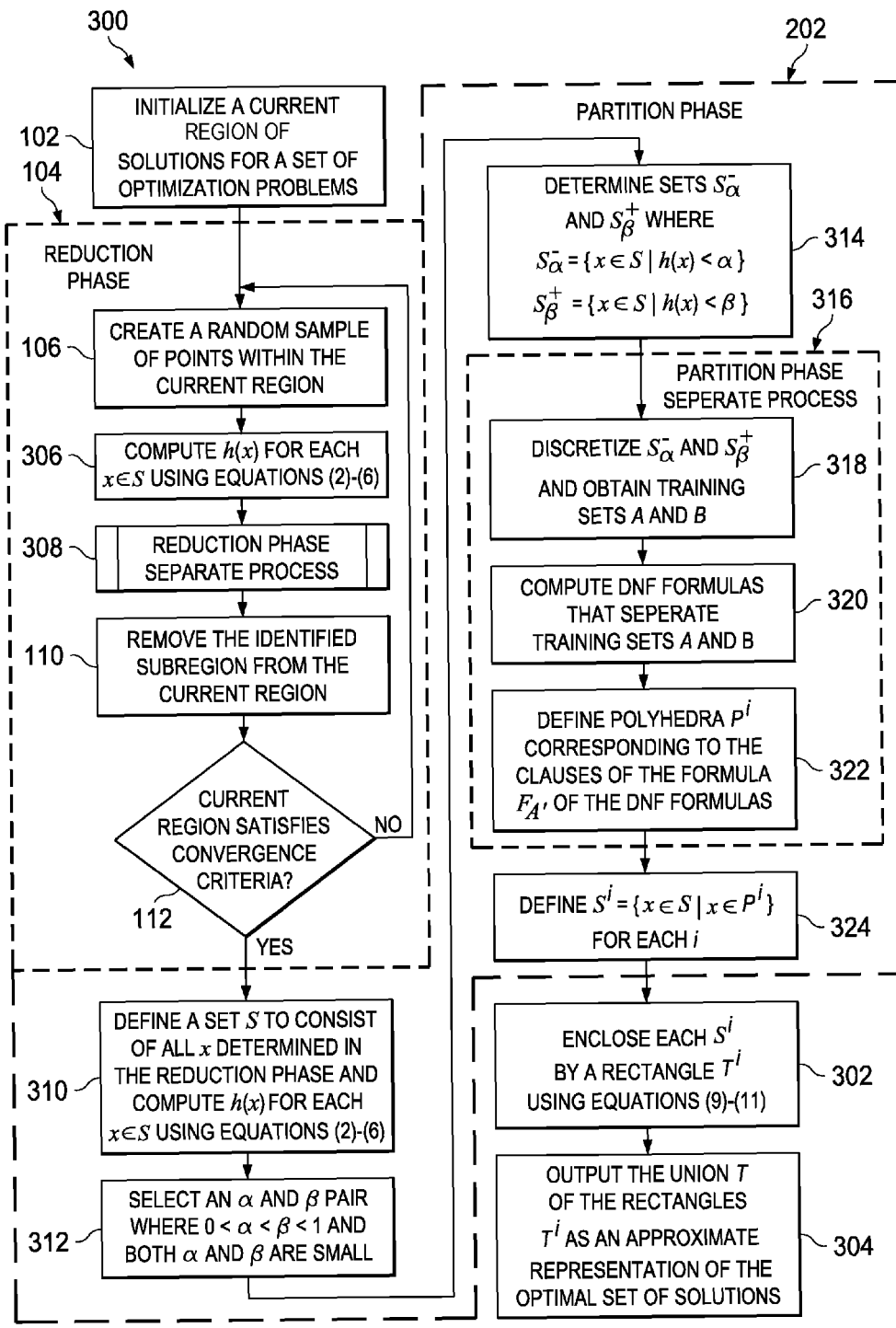
FIGS. 3A and 3B are flow charts showing a method for solving a set of optimization problems in accordance with yet another embodiment of the present invention.
Figure 3B:
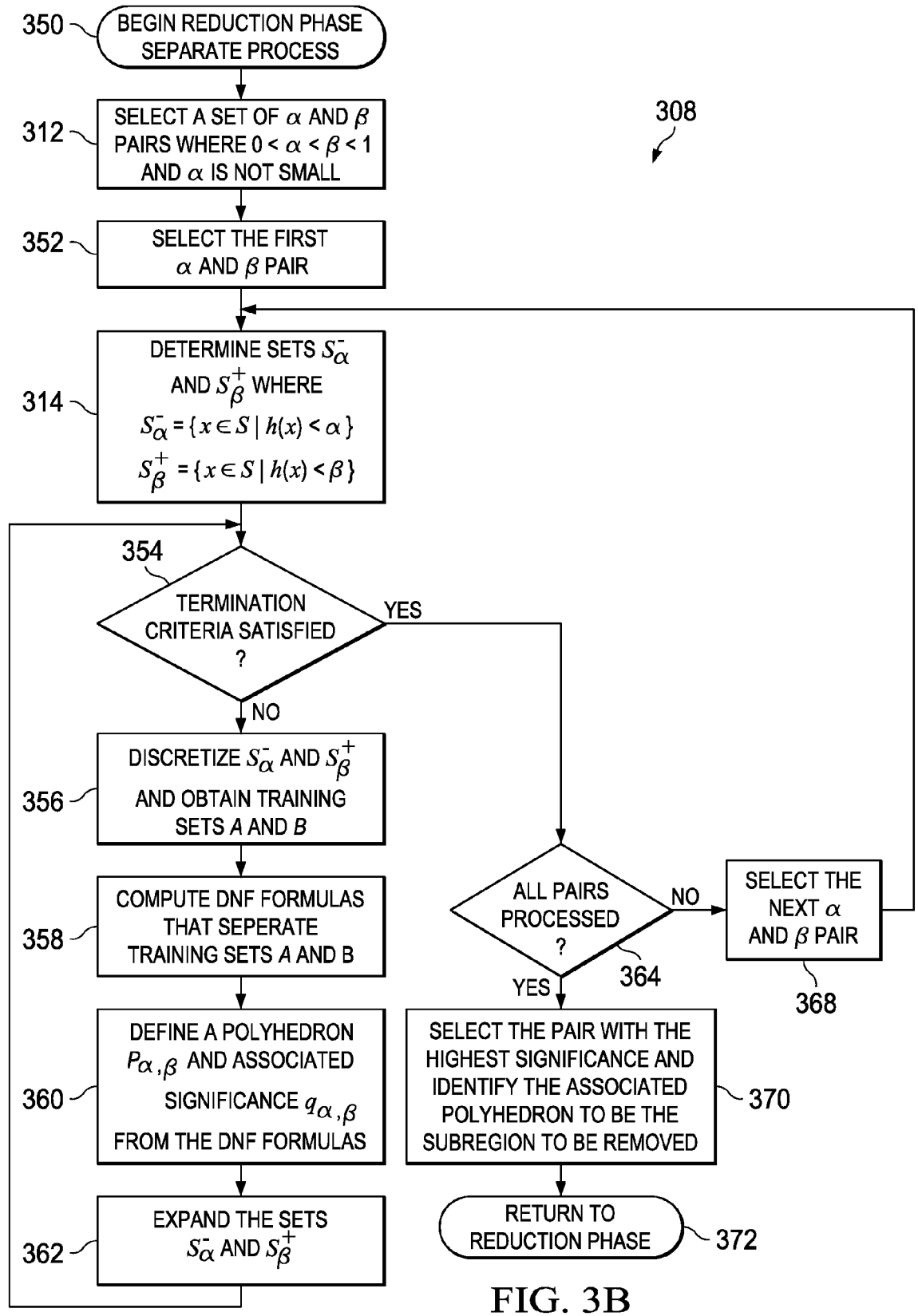

Now referring to FIGS. 3A and 3B, flow charts showing a method 300 for solving a set of optimization problems in accordance with yet another embodiment of the present invention are shown. A current region of solutions for the set of optimization problems is initialized in block 102, a reduction phase 104 is performed, a partition phase 202 is performed, and a compact approximate description of the solution space (the optimal solutions within the current region) is provided to the output device in block 304. The reduction phase 104 creates a random sample of points within the current region in block 106. The random sample of points is created using an unbiased random process, a biased random process, a single-variable inequities process, a shrinking a search rectangle process, a divide-and-conquer process, or a combination thereof. In block 306, h(x) is computed for each x ∈ S using $$f_k^{min} = \min\{f_k(x) \mid x \in \overline{S}\}$$

$$f_k^{max} = \max\{f_k(x) \mid x \in \overline{S}\}$$

$$g_k(x) = \begin{cases} \frac{(f_k(x) - f_k^{min})}{(f_k^{max} - f_k^{min})}, & x \in \overline{S} \text{ and } f_k^{max} > f_k^{min} \\ 0, & x \in \overline{S} \text{ and } f_k^{max} = f_k^{min} \\ 1, & x \in (S - \overline{S}) \end{cases}$$

$$d(x, y) = \max_k \{g_k(x) - g_k(y)\},$$

$y \in S$ and $x$ and $y$ are comparable $$h(x) = \max_{y \in S}\{d(x, y) \mid x \text{ and } y \text{ are comparable}\}$$

where: $\overline{S}$ contains the x ∈ S for which all entries $f_k(x)$ of $f(x)$ are finite,
  for each index k, $1 \leq k \leq m$, $0 \leq g_k(x) \leq 1$,
  $0 \leq d(X,Y) \leq 1$,
  d(x,x)=0, and
  x ∈ S and y ∈ S are comparable if g(x)≧g(y).
A reduction phase separate process is performed in block 308 (see FIG. 3B) to identify a subregion that very likely does not contain any optimal solutions. The identified subregion identified by the selected α and β pair (see block 370 in FIG. 3B) is then removed from the current region in block 110. If the current region does not satisfies one or more convergence criteria, as determined in decision block 112, the process loops back to block 106 to create another random sample of points and repeats the above-described steps. If, however, the current region does satisfy the convergence criteria, as determined in decision block 112, the partition phase 202 is performed. The one or more convergence criteria include a significance criterion, a volume reduction criterion, a reduction factor criterion, a number of rounds, a number of function evaluations, an efficiency of the step of creating the random sample of points, the subregion cannot be identified, any Machine Learning technique that can derive from randomly drawn samples of two populations a classification that reliably separates the two populations, or a combination thereof or a combination thereof.

The partition phase separate process 308 (FIG. 3B) begins in block 350. A set of α and β pairs where 0<α<β<1 and α is not small is selected in block 312. A first α and β pair is selected in block 352 and a set $S_\alpha^-$ and $S_\beta^+$ are determined using $$S_\alpha^- = \{x \in S \mid h(x) < \alpha\}$$

$$S_\beta^+ = \{x \in S \mid h(x) > \beta\}.$$

in block 314. If one or more termination criteria are not satisfied, as determined in decision block 354, $S_\alpha^-$ and $S_\beta^+$ are discretized and a training set A and a training set B are obtained in block 356. One or more DNF formulas that separate the sets A and B are computed in block 358. A polyhedron $P_{\alpha,\beta}$ and an associated significance $q_{\alpha,\beta}$ are defined from the DNF formulas in block 360, and the sets $S_\alpha^-$ and $S_\beta^+$ are expanded in block 362. Thereafter, the process repeats decision block 354 to determine whether the termination criteria are satisfied. If, however the termination criteria are satisfied, as determined in decision block 354, and all the α and β pairs have not been processed, as determined in decision block 364, the next α and β pair are selected in block 368 and the process loops back to block 314 to determine new sets $S_\alpha^-$ and $S_\beta^+$ and repeat the steps previously described. If, however, all the α and β pairs have been processed, as determined in decision block 364, the α and β pair having a highest significance is selected in block 307, the associated polyhedron is identified as the subregion to be removed, and the process returns to the reduction process 104 in block 372. The selected α and β pair can be selected using one or more tie breakers whenever multiple α and β pairs have the highest significance, wherein the tie breakers comprise a smaller stage number, a larger α value, or a smaller β value.

The partition phase 202 defines a set S to consist of all x determined in the reduction phase 104, and computes h(x) for each x ∈ S in block 310 using $$f_k^{min} = \min\{f_k(x) \mid x \in \overline{S}\}$$

$$f_k^{max} = \max\{f_k(x) \mid x \in \overline{S}\}$$

$$g_k(x) = \begin{cases} \frac{(f_k(x) - f_k^{min})}{(f_k^{max} - f_k^{min})}, & x \in \overline{S} \text{ and } f_k^{max} > f_k^{min} \\ 0, & x \in \overline{S} \text{ and } f_k^{max} = f_k^{min} \\ 1, & x \in (S - \overline{S}) \end{cases}$$

$$d(x, y) = \max_k \{g_k(x) - g_k(y)\},$$

$y \in S$ and $x$ and $y$ are comparable $$h(x) = \max_{y \in S}\{d(x, y) \mid x \text{ and } y \text{ are comparable}\}$$

where: $\overline{S}$ contains the x ∈ S for which all entries $f_k(x)$ of $f(x)$ are finite,
  for each index k, $1 \leq k \leq m$, $0 \leq g_k(x) \leq 1$,
  $0 \leq d(x, y) \leq 1$,
  d(x,x)=0, and
  x ∈ S and y ∈ S are comparable if g(x)≧g(y).
An α and β pair is selected in block 312 where 0<α<β<1 and both α and β are small. A second set $S_\alpha^-$ and $S_\beta^+$ are determined in block 314 using $$S_\alpha^- = \{x \in S \mid h(x) < \alpha\}$$

$$S_\beta^+ = \{x \in S \mid h(x) > \beta\}.$$

The partition phase separate process 316 discretizes $S_\alpha^-$ and $S_\beta^+$ and obtains a second training set A and a second training set B in block 318, computes one or more second DNF formulas that separate the second sets A and B in block 320, and defines polyhedra $P^i$ corresponding to the clauses of the formula $f_A$, of the second DNF formulas in block 322. After the partition phase separate process 316 is completed, sets $S^i = \{x \in S \mid x \in P^i\}$ are defined in block 324 to complete the partition phase 202. Thereafter, each $S^i$ is enclosed by a rectangle $T^i$ using:

$a_k^i = \min\{x_k | x \in S^i\}$ $b_k^i = \max\{x_k | x \in S^i\}$ $T^i = \{x | a^i \leq x \leq b^i\}$ in block 302. A compact approximate description of the solution space is provided to the output device in block 304, wherein the compact approximate description comprises a union T of the rectangles $T^i$. Additional optional steps may include enlarging the sets $T^i$ such that the rectangles are unbiased; or generalizing the set of optimization problems using one or more integer variables or a set of conditional pareto optimality solutions. This method can be implemented using a computer program embodied on a computer readable medium that is executed by one or more processors wherein each step is executed by one or more code segments.

Figure 4:
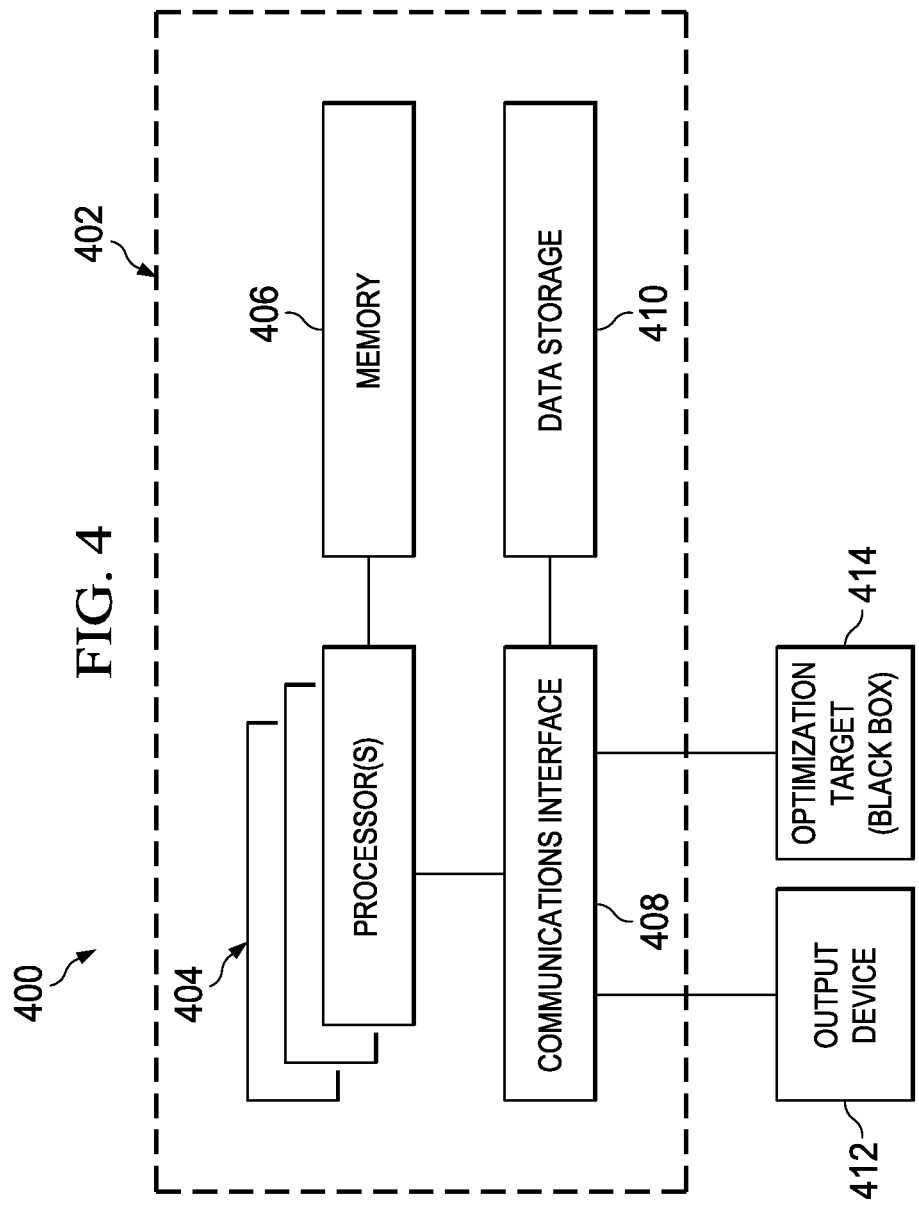
FIG. 4 is a block diagram of an apparatus for solving a set of optimization problems in accordance with another embodiment of the present invention.

Referring now to FIG. 4, a block diagram of a system 400 for solving a set of optimization problems in accordance with another embodiment of the present invention is shown. The system 400 includes a computer 402 having one or more processors 404, a memory 406 communicably coupled to the processors, a communications interface 408 communicably coupled to the processor(s) 404; and one or more data storage devices 410 communicable coupled to the processor(s) 404 via the communications interface 408. Note that the communications interface 408 can be any number of separate communication interfaces (e.g., video, audio, device/drive controllers, data ports, printer ports, network interfaces, etc.). The computer 402 can be any fixed, distributed or portable computational device suitable to execute the processes described herein. One or more output devices 412 are communicably coupled to the processor(s) 404 via the communications interface 408. The output devices 412 can be any suitable user interface that allows a user to start, control, monitor, modify and use the output provided by the processes described herein. An optimization target or black box 414 is communicably coupled to the processor(s) 404 via the communications interface 408. The processor(s) 404 perform the steps previously described herein (e.g., FIGS. 1, 2, or 3A-B) to solve the set of optimization problems.

Computational Results. Some computational results for a first, experimental, implementation of POLYSEP will now be described in which the extensions described above were used except for the divide-and-conquer method.

In Janiga et al. (2009), standard benchmark problems by Schaffer (1984) and

Kursawe (1991), and a turbulent flow problem based on Wilcox (1998) are discussed and solved by POLYSEP and, for comparison purposes, by the state-of-the-art genetic algorithm NSGAII (Deb et al. (2000)).

Here, the behavior of POLYSEP is explored on the most difficult cases of the cited references, which are the problem of Kursawe (1991) and the turbulent flow problem of Wilcox (1998). In the former problem, two functions are to be minimized over a 3-dimensional rectangle, specified as follows (Kursawe (1991); Van Veldhuizen (1999)).

$$X = \{x \in E^3 \mid -5 \leq x_j \leq 5; j = 1, 2, 3\} \quad (25)$$

$$f_1(x) = -10\left(e^{-0.2}\sqrt{(x_1^2 + x_2^2)} + e^{-0.2}\sqrt{(x_2^2 + x_3^2)}\right) \quad (26)$$

$$f_2(x) = \sum_{i=1}^{3} [|x_i|^{0.8} + 5.0\sin(x_i^3)] \quad (27)$$

For illustrative purposes, four runs are carried out each of which is limited to a certain number of rounds. That way the solutions obtained under that limitation can be evaluated. A sample size m=50 is used, which has been found appropriate for low-dimensional instances. The results are shown in Table 1.

TABLE 1

Convergence for Kursawe Problem (m = 50)

| No. of Rounds | No. of Function Eval's | Volume Reduction at Beg. Round | Average Reduction Factor at Beg. Round | No. of Solution Regions | No. of Optimal Solutions | Run Time (sec) |
| --- | --- | --- | --- | --- | --- | --- |
| 5  | 112 | 0.21   | 0.68 | 5 | 6  | 3  |
| 10 | 236 | 0.005  | 0.56 | 5 | 13 | 6  |
| 15 | 325 | 0.0005 | 0.58 | 7 | 17 | 9  |
| 20 | 388 | 0.0001 | 0.62 | 8 | 37 | 12 |

As an example, the last line of Table 1 is interpreted; below, statement (k) explains the kth column of the table. The line tells the following, where the statement numbers correspond to the columns. (1) The run carries out 20 rounds; (2) a total of 388 points are evaluated up to an including round 20; (3) the volume reduction factor at the beginning of round 20 is 0.0001; (4) the average reduction factor at that time is 0.62; (5,6) Partition derives 8 solution regions containing a total of 37 optimal solutions; (7) the total run time, which is for a 3.0 GHz PC, is 12 sec. It should be emphasized that the cited run times are for the experimental implementation, which is an inefficient pyramid of routines using up to several thousand files for data transfers. An efficient implementation would be much faster.

The columns of Table 1 for the volume reduction and the average reduction factor show that convergence is rapid and uniform, with rate approximately equal to 0.6. At the same time, the solution set increases from 6 to 37 points.

When a demanding $\eta=0.0001$ is used in the termination condition $v_j \leq \eta$ of (16), and when no a priori limit is imposed on the number of rounds, then POLYSEP terminates at the beginning of round 21. At that time, the volume reduction for the prior 20 rounds is estimated as $0.000097 < \eta = 0.0001$.

Figure 5:
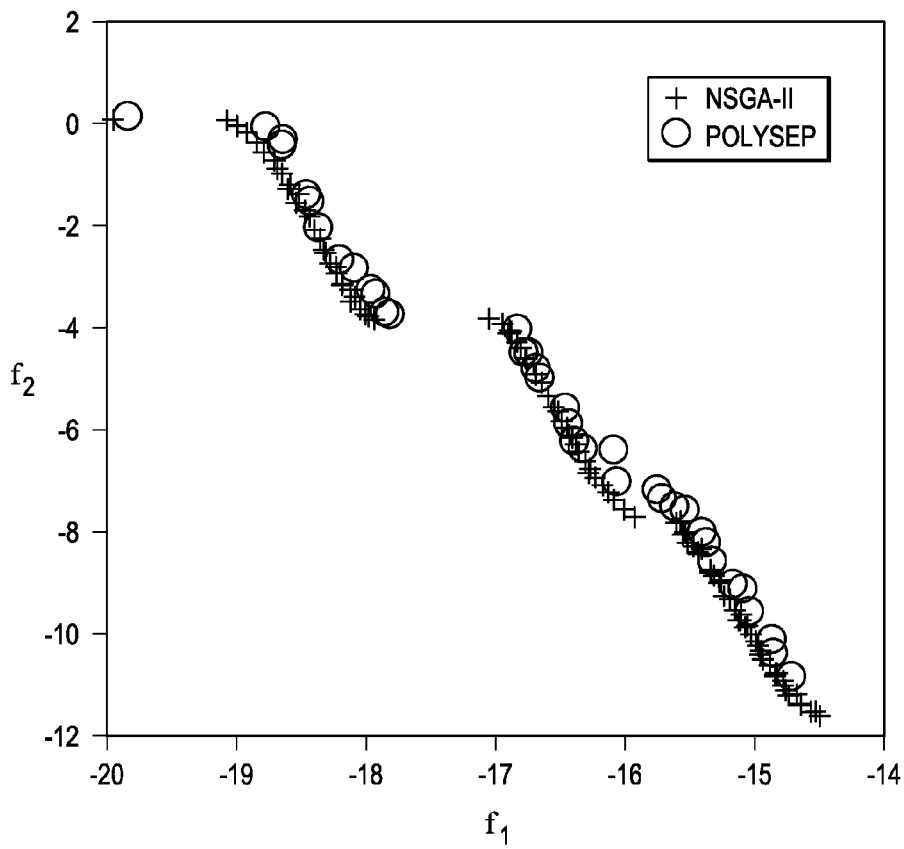
FIG. 5 is a graph showing the pairs of function values claimed to be optimal for the Kursawe Function by NSGA-II (prior art) and POLYSEP (present invention)

For evaluation of the accuracy of the POLYSEP solutions found in 20 rounds, the state-of-the-art genetic algorithm NSGA-II (Deb et al. (2000)) is applied to the problem, with both population size and number of generations equal to 100. Thus, 10,000 points are evaluated. Run time is about 2 sec. By direct enumeration of grid points it can be shown that the solutions produced by NSGA-II are an excellent representation of the set of optimal solutions. Hence, the NSGA-II output is used to assess the quality of the POLYSEP solutions. FIG. 5 plots the pairs of function values claimed to be optimal by NSGA-II and POLYSEP, using plus signs and circles, respectively. Evidently, a close approximation has been found by POLYSEP using 388 function evaluations. For comparison, the solutions produced by NSGA-II after 4 generations and 400 function evaluations have been examined. The plot turns out to be just a scatter diagram. After 10 generations and 1,000 function evaluations, the plot still does not indicate where the optimal values can be expected. After 20 generations and 2,000 function evaluations, the NSGA-II output exhibits the correct pattern, but not quite as accurately as POLYSEP. As a result, it can be concluded that POLYSEP requires far fewer function evaluations than NSGA-II to produce usable results.

Figure 6:
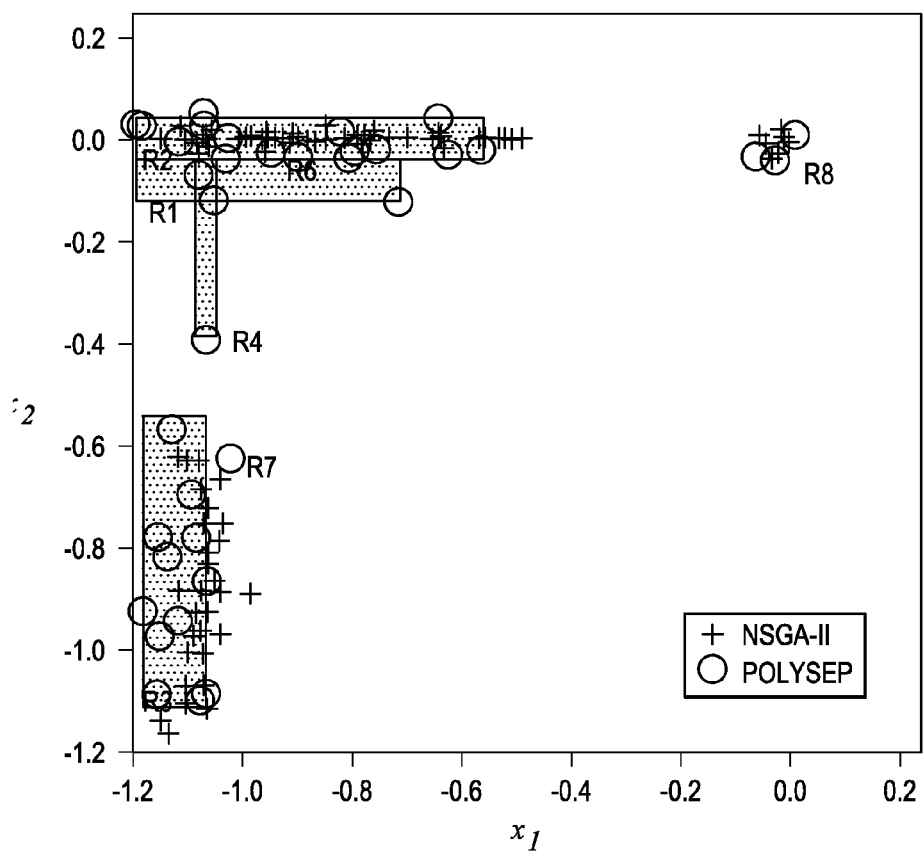
FIG. 6 is a graph of the Kursawe Solutions in the $(x_1,x_2)$-Plane by NSGA-II (prior art) and POLYSEP (present invention)
Figure 7:
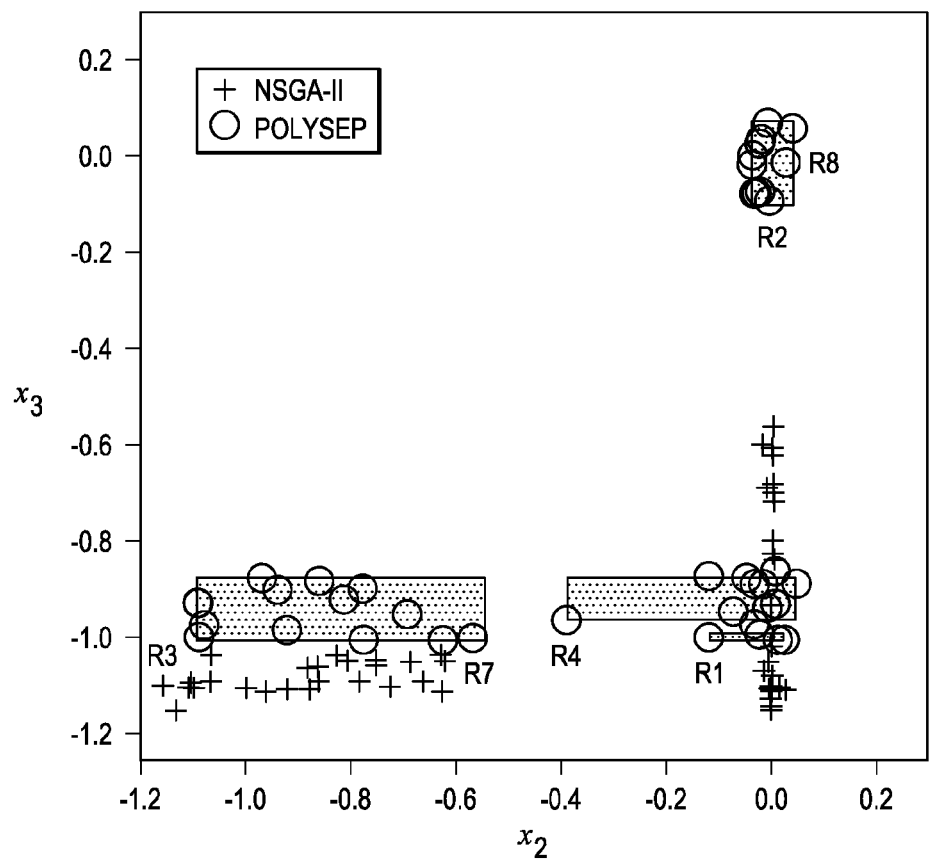
FIG. 7 is a graph of the Kursawe Solutions in the $(x_2,x_3)$-Plane by NSGA-II (prior art) and POLYSEP (present invention)

FIGS. 6 and 7 display the regions computed in round 20, that is, after evaluation of 388 points, and projected into the ($x_1$, $x_2$)-plane and ($x_2$, $x_3$)-plane, respectively. The shaded areas, labeled R1-R8, are the projected eight rectangles. The regions are an approximate representation of the NSGA-II solutions.

The turbulent flow problem of Wilcox (1998) concerns minimization of errors of a certain model for turbulent flows. The minimization problem involves five variables and four functions. The rectangle X is the 5-dimensional unit cube. For details of the formulation and background of the turbulent flow model giving rise to the optimization problem, see also Janiga et al. (2009). Table 2 summarizes the results obtained by POLYSEP in the same format as Table 1. Each lines corresponds to the case where the computation is stopped after j rounds, for j=3, 4, . . . , 8. The table does not go beyond 8 rounds since at the beginning of round 9 the volume reduction factor is equal to $0.000014 < \eta = 0.0001$, thus causing termination due to the $\eta$ threshold. Note how convergence accelerates; the average reduction factor drops from 0.52 for 3 rounds to 0.28 for 8 rounds.

TABLE 2

Convergence for Turbulence Problem

| No. of Rounds j | No. of Function Eval's | Volume Reduction at Beg. Round $v_j$ | Average Reduction Factor at Beg. Round $\bar{r}_j$ | No. of Solution Regions | No. of Optimal Solutions | Run Time (sec) |
|---|---|---|---|---|---|---|
| 3 | 98 | 0.27 | 0.52 | 1 | 1 | 2 |
| 4 | 134 | 0.07 | 0.42 | 1 | 1 | 3 |
| 5 | 168 | 0.02 | 0.39 | 2 | 2 | 4 |
| 6 | 203 | 0.007 | 0.37 | 1 | 1 | 4 |
| 7 | 246 | 0.001 | 0.32 | 1 | 1 | 5 |
| 8 | 289 | 0.0001 | 0.28 | 1 | 2 | 6 |

Figure 8:
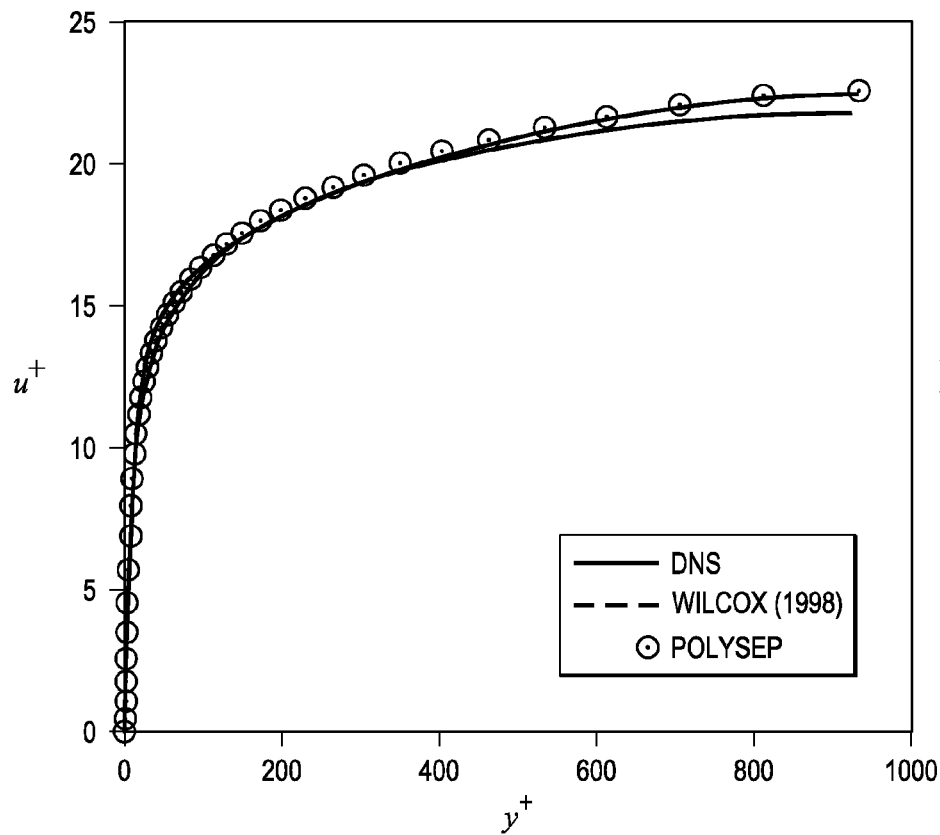
FIG. 8 is a graph of the velocity profiles for DNS (prior art), Wilcox (1998) (prior art) and POLYSEP (present invention).

Round 8 produces two virtually identical solutions that for all four Reynolds numbers attain smaller deviations than the solution proposed in Wilcox (1998) and thus dominate the latter solution. In Janiga et al. (2009), the quality of the POLYSEP solution is analyzed. The conclusion is that the turbulent flow model using the POLYSEP solution results in accurate model predictions when compared with precise simulation results. One of the comparison graphs of the cited reference concerns a certain velocity profile, here shown in FIG. 8. In the graph, the solid line labeled DNS represents precise values, the circles are values based on the POLYSEP solution, and the dashed line are values based on the solution of Wilcox (1998). Clearly, the POLYSEP solution produces an accurate profile.

G. Janiga of the University of Magdeburg, Germany, has applied the state-of-the-art genetic algorithms NSGA-II to the problem. The method finds an increasing number of solutions with increasing number of generations. For example, the population size 48 and 100 generations, and thus using a total of 4,800 function evaluations, NSGA-II obtains 60 solutions that are Pareto optimal relative to all solutions obtained in those generations. Of the 60 solutions, 10 dominate the single POLYSEP solution found in 289 function evaluations, but not too badly. Given the fact that the POLYSEP solution produces an accurate profile, as demonstrated by FIG. 8, any of the NSGA-II solutions can at most produce a marginal improvement over the accuracy obtained via the POLYSEP solution.

The function evaluations for the turbulent flow problem are quite time-consuming, requiring about 12 sec for each point. Thus, total time for the black box to evaluate the 289 points produced by POLYSEP is almost 1 hr, which dwarfs the 6 sec solution time required by POLYSEP. The 12 sec evaluation time for one point also implies that any technique carrying out a large number of function evaluations necessarily requires huge run times. For example, the 4,800 function evaluations by NSGA-II require 16 hrs.

References

1. Alpaydin, E. (2004). *Introduction to Machine Learning.* MIT Press.
2. Bäck T (1996). *Evolutionary Algorithms in Theory and Practice.* Oxford University Press.
3. Bartnikowski, S., M. Granberry, J. Mugan, K. Truemper (2006). Transformation of rational and set data to logic data. *Data Mining and Knowledge Discovery Approaches Based on Rule Induction Techniques.* Springer.
4. Better, M., F. Glover, M. Laguna (2007). Advances in analytics: Integrating dynamic data mining with simulation optimization. *IBM Journal of Research and Development* 51 1-11.
5. Burges, C. J. C. (1998). A tutorial on support vector machines for pattern recognition. *Data Mining and Knowledge Discovery* 2 955-974.
6. Coello Coello C A, Lamont G B, Van Veldhuizen D A (1996). *Evolutionary Algorithms in Theory and Practice.* Oxford University Press.
7. Deb K, Agrawal S, Pratap A, Meyarivan T (2000). A fast elitist nondominated sorting genetic algorithm for multi-objective optimization: NSGA-II. In: Schoenauer M, Deb K, Rudolph G, Yao X, Lutton E, Merelo J J, Schwefel H P (eds) *Proceedings of the Parallel Problem Solving from Nature VI Conference*, Springer, pp 849-858.
8. Felici, G., F. Sun, K. Truemper (2006). Learning logic formulas and related error distributions. *Data Mining and Knowledge Discovery Approaches Based on Rule Induction Techniques.* Springer.
9. Felici, G., K. Truemper (2002). A MINSAT approach for learning in logic domain. *INFORMS Journal of Computing* 14 20-36.
10. Glover, F. (2009). Tabu search—uncharted domains. *Annals of Operations Research* to appear.
11. Glover F, Laguna M (1997). Tabu Search. Kluwer.
12. Goldberg D (1989). *Genetic Algorithms in Search, Optimization and Machine Learning.* Addison-Wesley.
13. Janiga G (2008). A few illustrative examples of CFD-based optimization: Heat exchanger, laminar burner and turbulence modeling. In: Thévenin D, Janiga G (eds) Optimization and Computational Fluid Dynamics, Springer, Berlin, pp 17-59.
14. Janiga, G., K. Truemper, R. Weismantel (2009). Computation of pareto optimal sets using approximate separating polyhedra, submitted.
15. Jensen, David. (1992). Induction with randomization testing: Decision-oriented analysis of large data sets. Ph.D. thesis, Washington University.
16. Jin, R., Y. Breitbart, C. Muoh (2007). Data discretization unification. *Proceedings of the IEEE International Conference on Data Mining* (ICDM'07).
17. Kamath, A. P., N. K. Karmarkar, K. G. Ramakrishnan, M. G. C. Resende (1992). A continuous approach to inductive inference. *Mathematical Programming* 57 215-238.
18. Khachiyan, L. G. (1979). A polynomial-time algorithm for linear programming *Soviet Math.* Dokl. 20 191-194.
19. Kirkpatrick S, Gelatt C D, Vecchi M P (1983). Optimization by simulated annealing. *Science* 220:671-680.

20. Koski K (1984). Multicriterion optimization in structural design. *New Directions in Optimum Structural Design*, Wiley and Sons.
21. Kursawe F (1991). A variant of evolution strategies for vector optimization. In: Schwefel HP, MöWanner R (eds) *Parallel Problem Solving from Nature. 1st Workshop, PPSN I, volume 496 of Lecture Notes in Computer Science*, Springer-Verlag, pp 193-197.
22. Mitchell, T. M. (1997). *Machine Learning*. McGraw-Hill.
23. Mugan, J., K. Truemper (2007). Discretization of rational data. *Proceedings of MML2004 (Mathematical Methods for Learning)*. IGI Publishing Group.
24. Riehl, K., K. Truemper (2008). Construction of deterministic, consistent, and stable explanations from numerical data and prior domain knowledge. URL http://www.utdallas.~eduk-klaus/Wpapers/explanation.pdf.
25. Robert C P, Casella G (2004). *Monte Carlo Statistical Methods*. Springer.
26. Schaffer J D (1984). Some experiments in machine learning using vector evaluated genetic algorithms. PhD thesis, Vanderbilt University, Nashville, Tenn., USA.
27. Thévenin D, Janiga G (eds) (2008). *Optimization and Computational Fluid Dynamics*. Springer, Berlin.
28. Triantaphyllou, E. (2008). *Data Mining and Knowledge Discovery via a Novel Logic-based Approach*. Springer.
29. Triantaphyllou, E., L. Allen, L. Soyster, S. R. T. Kumara (1994). Generating logical expressions from positive and negative examples via a branch-and-bound approach. *Computers and Operations Research* 21 185-197.
30. Truemper, K. (2009). Improved comprehensibility and reliability of explanations via restricted halfspace discretization. *Proceedings of International Conference on Machine Learning and Data Mining (MLDM 2009)*. LNAI 5632 1-15.
31. Van Veldhuizen D A (1999). Multiobjective evolutionary algorithms: Classifications, analyses, and new innovations. PhD thesis, Department of Electrical and Computer Engineering, Air Force Institute of Technology, Wright-Patterson AFB, Ohio.
32. Wilcox D C (1998). *Turbulence modeling for CFD*. DCWIndustries, Inc., La Cañada, Calif.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present invention have been described in detail, it will be understood by those skilled in the art that various modifications can be made therein without departing from the spirit and scope of the invention as set forth in the appended claims.

What is claimed is:

1. A method for solving a set of optimization problems using one or more computers having an output device, the method comprising the steps of:
   (a) initializing a current region of solutions for the set of optimization problems;
   (b) creating a random sample of points within the current region;
   (c) identifying a subregion of the current region wherein (1) all the randomly sampled points within the subregion (i) are non-optimal solutions to the set of optimization problems, and (ii) have a common characteristic that is not an effect of the random sampling, and (2) all points within the subregion have the common characteristic;
   (d) removing the identified subregion from the current region;
   (e) determining whether the current region satisfies one or more convergence criteria;
   (f) repeating steps (b) through (e) whenever the convergence criteria are not satisfied; and
   (g) providing the optimal solutions within the current region to the output device.

2. The method as recited in claim 1, wherein:
   the random sample of points is created using an unbiased random process, a biased random process, a single-variable inequities process, a shrinking a search rectangle process, a divide-and-conquer process, or a combination thereof;
   the subregion is identified using one or more support vector machines, one or more decision trees, one or more learning logic formulas or rules, one or more subgroup discovery methods, any Machine Learning technique that can derive from randomly drawn samples of two populations a classification that reliably separates the two populations, or a combination thereof; or
   the one or more convergence criteria comprise a significance criterion, a volume reduction criterion, a reduction factor criterion, a number of rounds, a number of function evaluations, an efficiency of the step of creating the random sample of points, the subregion cannot be identified, or a combination thereof.

3. The method as recited in claim 1, wherein:
   the set of optimization problems are provided by an optimization target;
   the current region of solutions comprises a set of bounding vectors for a current geometric shape;
   the subregion comprises an n-dimensional geometric shape wherein n=1 to 20 or more;
   the random sample points having scale values significantly greater than zero are non-optimal solutions to the set of optimization problems; or
   the provided solutions have scale values that are equal to or approximately equal to zero.

4. The method as recited in claim 1, wherein the common characteristic is determined using one or more alternate random processes.

5. The method as recited in claim 1, further comprising the steps of:
   (b1) adjusting the random sampled points based on one or more previously identified and removed subregions; or (b2) determining a total number of expected function evaluations for the method.

6. The method as recited in claim 1, wherein the step of providing the solutions within the current region to the output device comprises the steps of:
- (g1) determining a characterization of the points within the current region that (1) applies to all optimal and near optimal points, and (2) does not apply to the nonoptimal points;
- (g2) deriving a compact approximate description of a solution space from the characterization, wherein the compact approximate description comprises one or more formulas, thresholds or geometric bodies; and
- (g3) providing the compact approximate description of the solution space to the output device.

7. The method as recited in claim 6, wherein the compact approximate description comprises a union of rectangles.

8. A method for solving a set of optimization problems using one or more computers having an output device, the method comprising the steps of:
- (a) initializing a current region of solutions for the set of optimization problems;
- (b) creating a random sample of points within the current region;
- (c) computing h(x) for each x∈S using $$f_k^{min} = \min\{f_k(x) \mid x \in \overline{S}\}$$

$$f_k^{max} = \max\{f_k(x) \mid x \in \overline{S}\}$$

$$g_k(x) = \begin{cases} \frac{(f_k(x) - f_k^{min})}{(f_k^{max} - f_k^{min})}, & x \in \overline{S} \text{ and } f_k^{max} > f_k^{min} \\ 0, & x \in \overline{S} \text{ and } f_k^{max} = f_k^{min} \\ 1, & x \in (S - \overline{S}) \end{cases}$$

$$d(x, y) = \max_k\{g_k(x) - g_k(y)\},$$

$y \in S$ and $x$ and $y$ are comparable $$h(x) = \max_{y \in S}\{d(x, y) \mid x \text{ and } y \text{ are comparable}\}$$

where: $\overline{S}$ contains the x∈S for which all entries $f_k(x)$ of $f(x)$ are finite,
for each index k, $1 \leq k \leq m$, $0 \leq g_k(x) \leq 1$,
$0 \leq d(x,y) \leq 1$,
$d(x,x)=0$, and
x∈S and y∈S are comparable if g(x)≧g(y);
- (d) selecting a set of α and β pairs where 0<α<β<1 and α is not small;
- (e) selecting a first α and β pair;
- (f) determining a set $S_\alpha^-$ and $S_\beta^+$; using $S_\alpha^- = \{x \in S \mid h(x) < \alpha\}$ $S_\beta^+ = \{x \in S \mid h(x) > \beta\}$;

- (g) determining whether one or more termination criteria are satisfied;
- (h) whenever the termination criteria are not satisfied, discretizing $S_\alpha^-$ and $S_\beta^+$, obtaining a training set A and a training set B, computing one or more disjunctive normal form formulas that separate the sets A and B, defining a polyhedron $P_{\alpha,\beta}$ and an associated significance $q_{\alpha,\beta}$ from the disjunctive normal form formulas, expanding the sets $S_\alpha^-$ and $S_\beta^+$, and repeating step (g);
- (i) determining whether all the α and β pairs have been processed whenever the termination criteria are satisfied;
- (j) selecting the next α and β pair and repeating steps (f)-(i) whenever all the α and β pairs have not been processed;
- (k) selecting the α and β pair having a highest significance and identifying an associated polyhedron as a subregion to be removed whenever all the α and β pairs have been processed;
- (l) removing the subregion identified by the selected α and β pair from the current region;
- (m) determining whether the current region satisfies one or more convergence criteria;
- (n) repeating steps (b) through (m) whenever the convergence criteria are not satisfied;
- (o) defining a set S to consist of all x determined in steps (b) through (n), and computing h(x) for each x∈S using $$f_k^{min} = \min\{f_k(x) \mid x \in \overline{S}\}$$

$$f_k^{max} = \max\{f_k(x) \mid x \in \overline{S}\}$$

$$g_k(x) = \begin{cases} \frac{(f_k(x) - f_k^{min})}{(f_k^{max} - f_k^{min})}, & x \in \overline{S} \text{ and } f_k^{max} > f_k^{min} \\ 0, & x \in \overline{S} \text{ and } f_k^{max} = f_k^{min} \\ 1, & x \in (S - \overline{S}) \end{cases}$$

$$d(x, y) = \max_k\{g_k(x) - g_k(y)\},$$

$y \in S$ and $x$ and $y$ are comparable $$h(x) = \max_{y \in S}\{d(x, y) \mid x \text{ and } y \text{ are comparable}\}$$

where: $\overline{S}$ contains the x∈S for which all entries $f_k(x)$ of $f(x)$ are finite,
for each index k, $1 \leq k \leq m$, $0 \leq g_k(x) \leq 1$,
$0 \leq d(x,y) \leq 1$,
$d(x,x)=0$, and
x∈S and y∈S are comparable if g(x)≧g(y);
- (p) selecting a second set of α and β pairs where 0<α<β<1 and both α and β are small;
- (q) determining a second set $S_\alpha^-$ and $S_\beta^+$ using $S_\alpha^- = \{x \in S \mid h(x) < \alpha\}$ $S_\beta^+ = \{x \in S \mid h(x) > \beta\}$;

- (r) discretizing $S_\alpha^-$ and $S_\beta^+$, obtaining a second training set A and a second training set B;
- (s) computing one or more second disjunctive normal form formulas that separate the second sets A and B;
- (t) defining polyhedra $P^i$ corresponding to the clauses of a formula $F_{A'}$ of the second disjunctive normal form formulas that separates the second set A from the second set B;
- (u) defining $S^i = \{x \in S \mid x \in P^i\}$;
- (v) enclosing each $S^i$ by a rectangle $T^i$ using:

$a_k^i = \min\{x_k \mid x \in S^i\}$ $b_k^i = \max\{x_k \mid x \in S^i\}$ $T^i = \{x \mid a^i \leq x \leq b^i\}$; and

- (w) providing a compact approximate description of the solution space to the output device, wherein the compact approximate description comprises a union T of the rectangles $T^i$.

9. The method as recited in claim 8, wherein the selected α and β pair is selected using one or more tie breakers whenever multiple α and β pairs have the highest significance, wherein the tie breakers comprise a smaller stage number, a larger α value, or a smaller β value.

10. The method as recited in claim 8, wherein:
   the random sample of points is created using an unbiased random process, a biased random process, a single-variable inequities process, a shrinking a search rectangle process, a divide-and-conquer process, or a combination thereof or
   the one or more convergence criteria comprise a significance criterion, a volume reduction criterion, a reduction factor criterion, a number of rounds, a number of function evaluations, an efficiency of the step of creating the random sample of points, the subregion cannot be identified, or a combination thereof.

11. The method as recited in claim 8, wherein:
   the set of optimization problems are provided by an optimization target;
   the current region of solutions comprises a set of bounding vectors for a current geometric shape;
   the subregion comprises an n-dimensional geometric shape wherein n=1 to 20 or more; or
   the random sample points having scale values significantly greater than zero are non-optimal solutions to the set of optimization problems.

12. The method as recited in claim 8, further comprising the steps of:
   (b1) adjusting the random sampled points based on one or more previously identified and removed subregions; or
   (b2) determining a total number of expected function evaluations for the method.

13. The method as recited in claim 8, further comprising the steps of:
   eliminating one or more nonoptimal points such that the rectangles are unbiased; or
   generalizing the set of optimization problems using one or more integer variables or a set of conditional pareto optimality solutions.

14. A computer program embodied on a non-transitory computer readable storage medium that is executed using one or more computers having an output device for solving a set of optimization problems comprising:
   (a) a code segment for initializing a current region of solutions for the set of optimization problems;
   (b) a code segment for creating a random sample of points within the current region;
   (c) a code segment for identifying a subregion of the current region wherein (1) all the randomly sampled points within the subregion (i) are non-optimal solutions to the set of optimization problems, and (ii) have a common characteristic that is not an effect of the random sampling, and (2) all points within the subregion have the common characteristic;
   (d) a code segment for removing the identified subregion from the current region;
   (e) a code segment for determining whether the current region satisfies one or more convergence criteria;
   (f) a code segment for repeating steps (b) through (e) whenever the convergence criteria are not satisfied; and
   (g) a code segment for providing the optimal solutions within the current region to the output device.

15. The computer program as recited in claim 14, further comprising:
   (b1) a code segment for adjusting the random sampled points based on one or more previously identified and removed subregions; or
   (b2) a code segment for determining a total number of expected function evaluations for the method.

16. The computer program as recited in claim 14, wherein the code segment for providing the solutions within the current region to the output device comprising:
   (g1) a code segment for determining a characterization of the points within the current region that (1) applies to all optimal and near optimal points, and (2) does not apply to the nonoptimal points;
   (g2) a code segment for deriving a compact approximate description of a solution space from the characterization, wherein the compact approximate description comprises one or more formulas, thresholds or geometric bodies; and
   (g3) a code segment for providing the compact approximate description of the solution space to the output device.

17. A system for solving a set of optimization problems comprising:
   a computer comprising one or more processors, a memory communicably coupled to the processors and a communications interface communicably coupled to the processor(s);
   one or more output devices communicably coupled to the processor(s) via the communications interface;
   an optimization target communicably coupled to the processor(s) via the communications interface; and
   wherein the processor(s) perform the steps of:
   (a) initializing a current region of solutions for the set of optimization problems;
   (b) creating a random sample of points within the current region;
   (c) identifying a subregion of the current region wherein (1) all the randomly sampled points within the subregion (i) are non-optimal solutions to the set of optimization problems, and (ii) have a common characteristic that is not an effect of the random sampling, and (2) all points within the subregion have the common characteristic;
   (d) removing the identified subregion from the current region;
   (e) determining whether the current region satisfies one or more convergence criteria;
   (f) repeating steps (b) through (e) whenever the convergence criteria are not satisfied; and
   (g) providing the optimal solutions within the current region to the output device.

18. The system as recited in claim 17, wherein:
   the processor(s) operate in parallel;
   the random sample of points is created using an unbiased random process, a biased random process, a single-variable inequities process, a shrinking a search rectangle process, a divide-and-conquer process, or a combination thereof;
   the subregion is identified using one or more support vector machines, one or more decision trees, one or more learning logic formulas or rules, one or more subgroup discovery methods, any Machine Learning technique that can derive from randomly drawn samples of two populations a classification that reliably separates the two populations, or a combination thereof; or
   the one or more convergence criteria comprise a significance criterion, a volume reduction criterion, a reduction factor criterion, a number of rounds, a number of function evaluations, an efficiency of the step of creating the random sample of points, the subregion cannot be identified or a combination thereof.

19. The system as recited in claim 17, wherein:
   the set of optimization problems are provided by an optimization target;
   the current region of solutions comprises a set of bounding vectors for a current geometric shape;
   the subregion comprises an n-dimensional geometric shape wherein n=1 to 20 or more;
   the random sample points having scale values significantly greater than zero are non-optimal solutions to the set of optimization problems; or
   the provided solutions have scale values that are equal to or approximately equal to zero.

20. The system as recited in claim 17, wherein the common characteristic is determined using one or more alternate random processes.

21. The system as recited in claim 17, wherein the processor(s) further perform the steps of:
   (b1) adjusting the random sampled points based on one or more previously identified and removed subregions; or
   (b2) determining a total number of expected function evaluations for the method.

22. The system as recited in claim 17, wherein the step of providing the solutions within the current region to the output device comprises the steps of:
   (g1) determining a characterization of the points within the current region that (1) applies to all optimal and near optimal points, and (2) does not apply to the nonoptimal points;
   (g2) deriving a compact approximate description of a solution space from the characterization, wherein the compact approximate description comprises one or more formulas, thresholds or geometric bodies; and
   (g3) providing the compact approximate description of the solution space to the output device.

23. The system as recited in claim 22, wherein the compact approximate description comprises a union of rectangles.

24. A system for solving a set of optimization problems comprising:
   a computer comprising one or more processors, a memory communicably coupled to the processors and a communications interface communicably coupled to the processor(s);
   one or more output devices communicably coupled to the processor(s) via the communications interface;
   an optimization target communicably coupled to the processor(s) via the communications interface; and
   wherein the processor(s) perform the steps of:
      (a) initializing a current region of solutions for the set of optimization problems;
      (b) creating a random sample of points within the current region;
      (c) computing $h(x)$ for each $x \in S$ using $$f_k^{min} = \min\{f_k(x) \mid x \in \overline{S}\}$$

$$f_k^{max} = \max\{f_k(x) \mid x \in \overline{S}\}$$

$$g_k(x) = \begin{cases} \dfrac{(f_k(x) - f_k^{min})}{(f_k^{max} - f_k^{min})}, & x \in \overline{S} \text{ and } f_k^{max} > f_k^{min} \\ 0, & x \in \overline{S} \text{ and } f_k^{max} = f_k^{min} \\ 1, & x \in (S - \overline{S}) \end{cases}$$

$$d(x, y) = \max_k \{g_k(x) - g_k(y)\},$$

$y \in S$ and $x$ and $y$ are comparable $$h(x) = \max_{y \in S}\{d(x, y) \mid x \text{ and } y \text{ are comparable}\}$$

where: $\overline{S}$ contains the $x \in S$ for which all entries $f_k(x)$ of $f(x)$ are finite,
for each index k, $1 \leq k \leq m$, $0 \leq g_k(x) \leq 1$,
$0 \leq d(x,y) \leq 1$,
$d(x,x)=0$, and
$x \in S$ and $y \in S$ are comparable if $g(x) \geq g(y)$;
   (d) selecting a set of $\alpha$ and $\beta$ pairs where $0 < \alpha < \beta < 1$ and $\alpha$ is not small;
   (e) selecting a first $\alpha$ and $\beta$ pair;
   (f) determining a set $S_\alpha^-$ and $S_\beta^+$ using $$S_\alpha^- = \{x \in S \mid h(x) < \alpha\}$$

$$S_\beta^+ = \{x \in S \mid h(x) < \beta\};$$

(g) determining whether one or more termination criteria are satisfied;
   (h) whenever the termination criteria are not satisfied, discretizing $S_\alpha^-$ and $S_\beta^+$, obtaining a training set A and a training set B, computing one or more disjunctive normal form formulas that separate the sets A and B, defining a polyhedron $P_{\alpha,\beta}$ and an associated significance $q_{\alpha,\beta}$ from the disjunctive normal form formulas, expanding the sets $S_\alpha^-$, and repeating step (g);
   (i) determining whether all the $\alpha$ and $\beta$ pairs have been processed whenever the termination criteria are satisfied;
   (j) selecting the next $\alpha$ and $\beta$ pair and repeating steps (f)-(i) whenever all the $\alpha$ and $\beta$ pairs have not been processed;
   (k) selecting the $\alpha$ and $\beta$ pair having a highest significance and identifying an associated polyhedron as a subregion to be removed whenever all the $\alpha$ and $\beta$ pairs have been processed;
   (l) removing the subregion identified by the selected $\alpha$ and $\beta$ pair from the current region;
   (m) determining whether the current region satisfies one or more convergence criteria;
   (n) repeating steps (b) through (m) whenever the convergence criteria are not satisfied;
   (o) defining a set S to consist of all x determined in steps (b) through (n), and computing $h(x)$ for each $x \in S$ using $$f_k^{min} = \min\{f_k(x) \mid x \in \overline{S}\}$$

$$f_k^{max} = \max\{f_k(x) \mid x \in \overline{S}\}$$

$$g_k(x) = \begin{cases} \dfrac{(f_k(x) - f_k^{min})}{(f_k^{max} - f_k^{min})}, & x \in \overline{S} \text{ and } f_k^{max} > f_k^{min} \\ 0, & x \in \overline{S} \text{ and } f_k^{max} = f_k^{min} \\ 1, & x \in (S - \overline{S}) \end{cases}$$

$$d(x, y) = \max_k \{g_k(x) - g_k(y)\},$$

$y \in S$ and $x$ and $y$ are comparable $$h(x) = \max_{y \in S}\{d(x, y) \mid x \text{ and } y \text{ are comparable}\}$$

where: $\overline{S}$ contains the $x \in S$ for which all entries $f_k(x)$ of $f(x)$ are finite,
for each index k, $1 \leq k \leq m$, $0 \leq g_k(x) \leq 1$,
$0 \leq d(x,y) \leq 1$,
$d(x,x)=0$, and
$x \in S$ and $y \in S$ are comparable if $g(x) \geq g(y)$;
   (p) selecting a second set of $\alpha$ and $\beta$ pairs where $0 < \alpha < \beta < 1$ and both $\alpha$ and $\beta$ are small;

(q) determining a second set $S_\alpha^-$ and $S_\beta^+$ using $S_\alpha^- = \{x \in S | h(x) < \}$ $S_\beta^+ = \{x \in S | h(x) > \beta\}$;

(r) discretizing $S_\alpha^-$ and $S_\beta^+$, obtaining a second training set A and a second training set B;

(s) computing one or more second disjunctive normal form formulas that separate the second sets A and B;

(t) defining a polyhedron $P^i$ corresponding to the clauses of a formula $F_A$ of the second disjunctive normal form formulas that separates the second set A from the second set B;

(u) defining $S^i = \{x \in S | x \in P^i\}$;

(v) enclosing each $S^i$ by a rectangle $T^i$ using:

$a_k^i = \min\{x_k | x \in S^i\}$ $b_k^i = \max\{x_k | x \in S^i\}$ $T^i = \{x | a^i \leq x \leq b^i\}$; and (w) providing a compact approximate description of the solution space to the output device, wherein the compact approximate description comprises a union T of the rectangles $T^i$.

25. The system as recited in claim 24, wherein the selected α and β pair is selected using one or more tie breakers whenever multiple α and β pairs have the highest significance, wherein the tie breakers comprise a smaller stage number, a larger α value, or a smaller β value.

26. The system as recited in claim 24, wherein:
the processor(s) operate in parallel;
the random sample of points is created using an unbiased random process, a biased random process, a single-variable inequities process, a shrinking a search rectangle process, a divide-and-conquer process, or a combination thereof; or
the one or more convergence criteria comprise a significance criterion, a volume reduction criterion, a reduction factor criterion, a number of rounds, a number of function evaluations, an efficiency of the step of creating the random sample of points, the subregion cannot be identified, or a combination thereof.

27. The system as recited in claim 24, wherein:
the set of optimization problems are provided by an optimization target;
the current region of solutions comprises a set of bounding vectors for a current geometric shape;
the subregion comprises an n-dimensional geometric shape wherein n=1 to 20 or more; or
the random sample points having scale values significantly greater than zero are non-optimal solutions to the set of optimization problems.

28. The system as recited in claim 24, wherein the processor(s) further perform the steps of:
(b1) adjusting the random sampled points based on one or more previously identified and removed subregions; or
(b2) determining a total number of expected function evaluations for the method.

29. The system as recited in claim 24, wherein the processor(s) further perform the steps of:
enlarging the sets such that the rectangles are unbiased; or
generalizing the set of optimization problems using one or more integer variables or a set of conditional pareto optimality solutions.

* * * * *

UNITED STATES PATENT AND TRADEMARK OFFICE
CERTIFICATE OF CORRECTION

PATENT NO. : 8,458,104 B2  
APPLICATION NO. : 12/817902  
DATED : June 4, 2013  
INVENTOR(S) : Klaus Truemper Page 1 of 1

It is certified that error appears in the above-identified patent and that said Letters Patent is hereby corrected as shown below:

Title Page

Item (73) Assignee:

Add Klaus Truemper, Plano, TX (US)

Signed and Sealed this  
Thirteenth Day of August, 2013

Teresa Stanek Rea  
*Acting Director of the United States Patent and Trademark Office*